(12) United States Patent
    Beers

(10) Patent No.: US 11,172,726 B2
(45) Date of Patent: *Nov. 16, 2021

(54) ARTICLE OF FOOTWEAR AND CHARGING SYSTEM

(71) Applicant: NIKE, Inc., Beaverton, OR (US)

(72) Inventor: Tiffany A. Beers, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/653,034

(22) Filed: Oct. 15, 2019

(65) Prior Publication Data

US 2020/0037694 A1    Feb. 6, 2020

Related U.S. Application Data

(63) Continuation of application No. 15/365,047, filed on Nov. 30, 2016, now Pat. No. 10,477,911, which is a
(Continued)

(51) Int. Cl.
    *A43B 3/00*      (2006.01)
    *A43C 11/00*     (2006.01)
    (Continued)

(52) U.S. Cl.
    CPC .......... *A43B 3/0005* (2013.01); *A43B 1/0054* (2013.01); *A43C 1/00* (2013.01);
    (Continued)

(58) Field of Classification Search
    CPC ... A43B 3/0005; A43B 1/0054; A43C 11/008; A43C 1/00; A43C 11/165; H02J 50/10; H02J 7/0042; H02J 7/025
    See application file for complete search history.

(56) References Cited

U.S. PATENT DOCUMENTS

| 1,184,396 A | 5/1916 | Trimble |
| 3,008,038 A | 11/1961 | Dickens |
| (Continued) |

FOREIGN PATENT DOCUMENTS

| CN | 2173521 Y | 8/1994 |
| CN | 2438353 Y | 7/2001 |
| (Continued) |

OTHER PUBLICATIONS

"U.S. Appl. No. 15/953,621 Preliminary Amendment Filed Apr. 23, 2018", 7 pgs.
(Continued)

*Primary Examiner* — Nha T Nguyen
(74) *Attorney, Agent, or Firm* — Schwegman Lundberg & Woessner, P.A.

(57) ABSTRACT

A charging system can include provisions for providing power to various systems or components associated with the article of footwear. A charging system may include a charging unit with one or more components configured for use with one or more articles of footwear, where the articles of footwear can include different sizes. The components can be magnetically joined to the article in some cases. Upon connection with a power source, the article may be configured to unlace automatically. In some cases, the charging system can be used to facilitate the transfer of power to components in an automated tensioning system.

11 Claims, 16 Drawing Sheets

Related U.S. Application Data continuation of application No. 15/059,385, filed on Mar. 3, 2016, now Pat. No. 9,943,139, which is a continuation of application No. 14/310,586, filed on Jun. 20, 2014, now Pat. No. 9,307,804, which is a continuation of application No. 13/955,007, filed on Jul. 31, 2013, now Pat. No. 8,769,844, which is a continuation of application No. 13/236,221, filed on Sep. 19, 2011, now Pat. No. 8,522,456, which is a continuation of application No. 12/114,022, filed on May 2, 2008, now Pat. No. 8,046,937.

(60) Provisional application No. 62/260,938, filed on Nov. 30, 2015.

(51) Int. Cl.
*A43B 1/00* (2006.01)
*A43C 1/00* (2006.01)
*A43C 11/16* (2006.01)
*H02J 50/10* (2016.01)
*H02J 7/00* (2006.01)
*H02J 7/02* (2016.01)

(52) U.S. Cl.
CPC .......... *A43C 11/008* (2013.01); *A43C 11/165* (2013.01); *H02J 7/0042* (2013.01); *H02J 7/025* (2013.01); *H02J 50/10* (2016.02)

(56) References Cited

U.S. PATENT DOCUMENTS

| | | |
|---|---|---|
| 3,070,907 A | 1/1963 | Joseph |
| 3,496,505 A | 2/1970 | Johannsen et al. |
| 3,668,791 A | 6/1972 | Salzman et al. |
| 3,893,247 A | 7/1975 | Dana, III |
| 3,946,505 A | 3/1976 | Dana, III |
| 4,020,572 A | 5/1977 | Chiaramonte, Jr. |
| 4,112,601 A | 9/1978 | Chiaramonte |
| 4,130,951 A | 12/1978 | Powell |
| 4,158,922 A | 6/1979 | Dana, III |
| 4,253,253 A | 3/1981 | Mccormick |
| 4,426,796 A | 1/1984 | Spademan |
| 4,433,456 A | 2/1984 | Baggio |
| 4,466,204 A | 8/1984 | Wu |
| 4,494,324 A | 1/1985 | Spademan |
| 4,551,933 A | 11/1985 | Morell et al. |
| 4,619,057 A | 10/1986 | Sartor et al. |
| 4,644,671 A | 2/1987 | Walkhoff |
| 4,670,999 A | 6/1987 | Olivieri |
| 4,724,626 A | 2/1988 | Baggio |
| 4,741,115 A | 5/1988 | Pozzobon |
| 4,848,009 A | 7/1989 | Rodgers |
| 4,895,110 A | 1/1990 | LoCascio |
| 4,922,634 A | 5/1990 | Seidel |
| 4,924,605 A | 5/1990 | Spademan |
| 4,999,936 A | 3/1991 | Calamia et al. |
| 5,033,212 A | 7/1991 | Evanyk |
| 5,060,402 A | 10/1991 | Rosen |
| 5,157,813 A | 10/1992 | Carroll |
| 5,174,051 A | 12/1992 | Walkhoff et al. |
| 5,188,447 A | 2/1993 | Chiang et al. |
| 5,205,055 A | 4/1993 | Harrell |
| 5,245,516 A | 9/1993 | De Haas et al. |
| 5,285,586 A | 2/1994 | Goldston et al. |
| 5,303,131 A | 4/1994 | Wu |
| 5,303,485 A | 4/1994 | Goldston et al. |
| 5,311,677 A | 5/1994 | Mann et al. |
| 5,311,678 A | 5/1994 | Spademan |
| 5,325,613 A | 7/1994 | Sussmann |
| 5,329,432 A | 7/1994 | Bland |
| 5,373,651 A | 12/1994 | Wood |
| 5,381,615 A | 1/1995 | Macmillan |
| 5,396,718 A | 3/1995 | Schuler et al. |
| 5,396,720 A | 3/1995 | Hwang et al. |
| 5,406,724 A | 4/1995 | Lin |
| 5,408,764 A | 4/1995 | Wut |
| 5,457,900 A | 10/1995 | Roy |
| 5,461,188 A | 10/1995 | Drago et al. |
| 5,469,342 A | 11/1995 | Chien |
| 5,479,325 A | 12/1995 | Chien |
| 5,483,759 A | 1/1996 | Silverman |
| 5,490,338 A | 2/1996 | Hwang et al. |
| 5,495,136 A | 2/1996 | Chiang et al. |
| 5,499,459 A | 3/1996 | Tomaro |
| 5,500,635 A | 3/1996 | Mott |
| 5,546,681 A | 8/1996 | Goldston et al. |
| 5,570,945 A | 11/1996 | Chien et al. |
| 5,572,817 A | 11/1996 | Chien |
| 5,592,759 A | 1/1997 | Cox |
| 5,599,088 A | 2/1997 | Chien |
| 5,611,621 A | 3/1997 | Chien |
| 5,644,858 A | 7/1997 | Bemis |
| 5,647,104 A | 7/1997 | James |
| 5,649,755 A | 7/1997 | Rapisarda |
| 5,651,197 A | 7/1997 | James |
| 5,692,324 A | 12/1997 | Goldston et al. |
| 5,704,705 A | 1/1998 | Chien |
| 5,704,706 A | 1/1998 | Goldston et al. |
| 5,722,757 A | 3/1998 | Chien |
| 5,732,486 A | 3/1998 | Rapisarda |
| 5,746,499 A | 5/1998 | Ratcliffe et al. |
| 5,765,300 A | 6/1998 | Kianka |
| 5,771,611 A | 6/1998 | Chang |
| 5,791,021 A | 8/1998 | James |
| 5,794,366 A | 8/1998 | Chien |
| 5,806,960 A | 9/1998 | Chien |
| 5,812,063 A | 9/1998 | Weng et al. |
| 5,813,148 A | 9/1998 | Guerra |
| 5,829,169 A | 11/1998 | James |
| 5,839,210 A | 11/1998 | Bernier et al. |
| 5,857,273 A | 1/1999 | Rapisarda |
| 5,860,727 A | 1/1999 | Chien |
| 5,865,523 A | 2/1999 | Chien |
| 5,866,987 A | 2/1999 | Wut |
| 5,879,069 A | 3/1999 | Chien |
| 5,894,201 A | 4/1999 | Wong |
| 5,894,686 A | 4/1999 | Parker et al. |
| 5,909,088 A | 6/1999 | Wut |
| 5,930,921 A | 8/1999 | Sorofman et al. |
| 5,933,985 A | 8/1999 | James |
| 5,934,599 A | 8/1999 | Hammerslag |
| 5,947,580 A | 9/1999 | Chien |
| 5,950,335 A | 9/1999 | Okajima |
| 5,955,957 A | 9/1999 | Calabrese et al. |
| 5,969,479 A | 10/1999 | Wong |
| 5,983,530 A | 11/1999 | Chou |
| 6,012,822 A | 1/2000 | Robinson |
| 6,017,128 A | 1/2000 | Goldston et al. |
| 6,032,387 A | 3/2000 | Johnson |
| 6,035,556 A | 3/2000 | Ballinger et al. |
| 6,052,921 A | 4/2000 | Greek |
| 6,104,140 A | 8/2000 | Wut |
| 6,112,437 A | 9/2000 | Lovitt |
| 6,199,305 B1 | 3/2001 | Steuerwald et al. |
| 6,202,953 B1 | 3/2001 | Hammerslag |
| 6,280,045 B1 | 8/2001 | Anteby et al. |
| 6,289,558 B1 | 9/2001 | Hammerslag |
| 6,378,230 B1 | 4/2002 | Rotem et al. |
| 6,427,361 B1 | 8/2002 | Chou |
| 6,457,261 B1 | 10/2002 | Crary |
| 6,467,194 B1 | 10/2002 | Johnson |
| 6,619,812 B2 | 9/2003 | Rapisarda |
| 6,643,954 B2 | 11/2003 | Voswinkel |
| 6,691,433 B2 | 2/2004 | Liu |
| 6,764,193 B1 | 7/2004 | Wei |
| 6,788,200 B1 | 9/2004 | Jamel et al. |
| 6,789,913 B2 | 9/2004 | Wei |
| 6,837,590 B2 | 1/2005 | Marston |
| 6,843,578 B1 | 1/2005 | Cheung |
| 6,896,128 B1 | 5/2005 | Johnson |
| 6,925,734 B1 | 8/2005 | Schaeffer |
| 6,952,891 B2 | 10/2005 | Hirayama |

(56) References Cited

U.S. PATENT DOCUMENTS

| | | |
|---|---|---|
| 6,991,342 B2 | 1/2006 | Gonet |
| 7,059,069 B2 | 6/2006 | Raluy et al. |
| 7,096,559 B2 | 8/2006 | Johnson |
| 7,103,994 B2 | 9/2006 | Johnson |
| 7,114,822 B2 | 10/2006 | Guzman |
| 7,147,337 B1 | 12/2006 | Rapisarda |
| 7,178,929 B2 | 2/2007 | Guzman |
| 7,181,870 B2 | 2/2007 | Guzman |
| 7,188,439 B2 | 3/2007 | Dibenedetto et al. |
| 7,210,253 B2 | 5/2007 | Yu |
| 7,225,565 B2 | 6/2007 | Dibenedetto et al. |
| 7,254,910 B2 | 8/2007 | Guzman |
| 7,255,468 B2 | 8/2007 | Capriola |
| 7,395,614 B1 | 7/2008 | Bailey, Sr. et al. |
| 7,503,131 B2 | 3/2009 | Nadel et al. |
| 7,510,293 B2 | 3/2009 | Chyn |
| 7,596,891 B2 | 10/2009 | Carnes et al. |
| 7,607,243 B2 | 10/2009 | Berner et al. |
| 7,721,468 B1 | 5/2010 | Johnson et al. |
| 7,752,774 B2 | 7/2010 | Ussher |
| 7,789,520 B2 | 9/2010 | Konig et al. |
| 7,794,101 B2 | 9/2010 | Galica et al. |
| 8,046,937 B2 | 11/2011 | Beers et al. |
| 8,056,269 B2 | 11/2011 | Beers et al. |
| 8,058,837 B2 | 11/2011 | Beers et al. |
| 8,086,421 B2 | 12/2011 | Case et al. |
| 8,234,798 B2 | 8/2012 | Dibenedetto |
| 8,384,551 B2 | 2/2013 | Ross et al. |
| 8,463,657 B1 | 7/2013 | Bentvelzen et al. |
| 8,522,456 B2 | 9/2013 | Beers et al. |
| 8,528,235 B2 | 9/2013 | Beers et al. |
| 8,628,453 B2 | 1/2014 | Balakrishnan et al. |
| 8,745,896 B2 | 6/2014 | Dua et al. |
| 8,769,844 B2 | 7/2014 | Beers et al. |
| 8,771,148 B2 | 7/2014 | Balakrishnan et al. |
| 8,784,350 B2 | 7/2014 | Cohen |
| 8,879,685 B2 | 11/2014 | Oshio |
| 8,935,860 B2 | 1/2015 | Torres |
| 8,938,892 B2 | 1/2015 | Case |
| 9,241,539 B1 | 1/2016 | Keswin |
| 9,610,185 B2 | 4/2017 | Capra et al. |
| 9,907,359 B2 | 3/2018 | Beers et al. |
| 9,943,139 B2 | 4/2018 | Beers et al. |
| 10,477,911 B2 | 11/2019 | Beers |
| 2002/0095750 A1 | 7/2002 | Hammerslag |
| 2003/0066207 A1 | 4/2003 | Gaither |
| 2003/0070324 A1 | 4/2003 | Nelson |
| 2003/0150135 A1 | 8/2003 | Liu |
| 2004/0103563 A1 | 6/2004 | Linge |
| 2004/0181972 A1 | 9/2004 | Csorba |
| 2004/0255490 A1 | 12/2004 | Wan et al. |
| 2005/0018417 A1 | 1/2005 | Chien |
| 2005/0018450 A1 | 1/2005 | Chien |
| 2005/0126043 A1 | 6/2005 | Reagan et al. |
| 2005/0183294 A1 | 8/2005 | Guzman |
| 2005/0198867 A1 | 9/2005 | Labbe |
| 2005/0207138 A1 | 9/2005 | Cheung |
| 2005/0235523 A1 | 10/2005 | Flechsig et al. |
| 2005/0284001 A1 | 12/2005 | Hoffman et al. |
| 2005/0286244 A1 | 12/2005 | Weng |
| 2005/0286248 A1 | 12/2005 | Weng |
| 2006/0002134 A1 | 1/2006 | Capriola |
| 2006/0007668 A1 | 1/2006 | Chien |
| 2006/0007670 A1 | 1/2006 | Chien |
| 2006/0053659 A1 | 3/2006 | Johnson |
| 2006/0101674 A1 | 5/2006 | Ungari |
| 2006/0156517 A1 | 7/2006 | Hammerslag et al. |
| 2006/0156588 A1 | 7/2006 | Ferrell |
| 2006/0198121 A1 | 9/2006 | Thorpe et al. |
| 2006/0221596 A1 | 10/2006 | Chang |
| 2006/0262517 A1 | 11/2006 | Doerer et al. |
| 2007/0000154 A1 | 1/2007 | Dibenedetto et al. |
| 2007/0011912 A1 | 1/2007 | Clark et al. |
| 2007/0011914 A1 | 1/2007 | Keen et al. |
| 2007/0011919 A1 | 1/2007 | Case, Jr. |
| 2007/0011920 A1 | 1/2007 | Dibenedetto et al. |
| 2007/0028486 A1 | 2/2007 | Montanya et al. |
| 2007/0041193 A1 | 2/2007 | Wong et al. |
| 2007/0130804 A1 | 6/2007 | Levy et al. |
| 2007/0147026 A1 | 6/2007 | Tseng |
| 2007/0180736 A1 | 8/2007 | Dibenedetto et al. |
| 2007/0180737 A1 | 8/2007 | Dibenedetto et al. |
| 2007/0201221 A1 | 8/2007 | Cherdak et al. |
| 2007/0211451 A1 | 9/2007 | Chung |
| 2007/0236915 A1 | 10/2007 | Chen |
| 2007/0267398 A1 | 11/2007 | Mccoy |
| 2008/0054845 A1 | 3/2008 | Wang |
| 2008/0060224 A1 | 3/2008 | Whittlesey et al. |
| 2008/0086911 A1 | 4/2008 | Labbe |
| 2008/0197126 A1 | 8/2008 | Bourke et al. |
| 2008/0203144 A1 | 8/2008 | Kim |
| 2008/0246439 A1 | 10/2008 | Tsui et al. |
| 2008/0301919 A1 | 12/2008 | Ussher |
| 2008/0307673 A1 | 12/2008 | Johnson |
| 2009/0199435 A1 | 8/2009 | Robinson, Jr. et al. |
| 2009/0272007 A1 | 11/2009 | Beers et al. |
| 2009/0272013 A1 | 11/2009 | Beers et al. |
| 2009/0273311 A1* | 11/2009 | Beers .................. H02J 50/40 320/108 |
| 2010/0033321 A1 | 2/2010 | Kaminski et al. |
| 2010/0037489 A1 | 2/2010 | Berner, Jr. et al. |
| 2010/0115799 A1 | 5/2010 | Welter et al. |
| 2010/0223816 A1 | 9/2010 | Barfield |
| 2011/0054359 A1 | 3/2011 | Sazonov et al. |
| 2011/0107771 A1 | 5/2011 | Crist et al. |
| 2011/0175744 A1 | 7/2011 | Englert et al. |
| 2011/0225843 A1 | 9/2011 | Kerns et al. |
| 2011/0258876 A1 | 10/2011 | Baker et al. |
| 2011/0260857 A1 | 10/2011 | Hamill |
| 2011/0266384 A1 | 11/2011 | Goodman et al. |
| 2012/0000091 A1 | 1/2012 | Cotterman et al. |
| 2012/0007504 A1 | 1/2012 | Beers et al. |
| 2012/0187903 A1* | 7/2012 | Tabata .................. H02J 50/70 320/108 |
| 2012/0192462 A1 | 8/2012 | Hsu |
| 2012/0234111 A1 | 9/2012 | Molyneux et al. |
| 2013/0019694 A1 | 1/2013 | Molyneux et al. |
| 2013/0086816 A1 | 4/2013 | Johnson et al. |
| 2013/0091731 A1 | 4/2013 | Wang |
| 2013/0104429 A1 | 5/2013 | Torres |
| 2013/0130843 A1 | 5/2013 | Burroughs et al. |
| 2013/0138029 A1 | 5/2013 | Gerber et al. |
| 2013/0211290 A1 | 8/2013 | Lee |
| 2013/0219754 A1 | 8/2013 | Nowak et al. |
| 2014/0026440 A1 | 1/2014 | Beers et al. |
| 2014/0057233 A1 | 2/2014 | Morag et al. |
| 2014/0068838 A1 | 3/2014 | Beers et al. |
| 2014/0070042 A1 | 3/2014 | Beers et al. |
| 2014/0082963 A1 | 3/2014 | Beers |
| 2014/0094728 A1 | 4/2014 | Soderberg et al. |
| 2014/0137434 A1 | 5/2014 | Craig |
| 2014/0196314 A1 | 7/2014 | Beye et al. |
| 2014/0196316 A1 | 7/2014 | Follet |
| 2014/0228987 A1 | 8/2014 | Case et al. |
| 2014/0244009 A1 | 8/2014 | Mestas |
| 2014/0245638 A1 | 9/2014 | Seamarks et al. |
| 2014/0249660 A1 | 9/2014 | Prstojevich |
| 2014/0257156 A1 | 9/2014 | Capra et al. |
| 2014/0260677 A1 | 9/2014 | Dojan et al. |
| 2014/0277632 A1 | 9/2014 | Walker |
| 2014/0330409 A1 | 11/2014 | Case, Jr. et al. |
| 2014/0338225 A1 | 11/2014 | Bliss |
| 2014/0358472 A1 | 12/2014 | Goel et al. |
| 2014/0360047 A1 | 12/2014 | Beers et al. |
| 2015/0047230 A1 | 2/2015 | Beers |
| 2015/0059204 A1 | 3/2015 | Alexander et al. |
| 2015/0096204 A1 | 4/2015 | Case |
| 2015/0104772 A1 | 4/2015 | Goel et al. |
| 2015/0250268 A1 | 9/2015 | Alt et al. |
| 2015/0289594 A1 | 10/2015 | Rushbrook et al. |
| 2016/0143396 A1 | 5/2016 | Beers |
| 2016/0219985 A1 | 8/2016 | Beers et al. |
| 2016/0345654 A1 | 12/2016 | Beers |
| 2016/0345679 A1 | 12/2016 | Beers et al. |

(56) References Cited

U.S. PATENT DOCUMENTS

| | | |
|---|---|---|
| 2016/0345681 A1 | 12/2016 | Pheil et al. |
| 2017/0135444 A1 | 5/2017 | Vincent |
| 2017/0150773 A1 | 6/2017 | Beers |
| 2018/0153260 A1 | 6/2018 | Beers |
| 2018/0228250 A1 | 8/2018 | Beers et al. |
| 2020/0221827 A1 | 7/2020 | Beers et al. |
| 2020/0315298 A1 | 10/2020 | Beers et al. |

FOREIGN PATENT DOCUMENTS

| | | |
|---|---|---|
| CN | 2521934 Y | 11/2002 |
| CN | 1387743 A | 12/2002 |
| CN | 2534836 Y | 2/2003 |
| CN | 1679986 | 10/2005 |
| CN | 1742516 A | 3/2006 |
| CN | 1810172 A | 8/2006 |
| CN | 2810253 Y | 8/2006 |
| CN | 2914720 Y | 6/2007 |
| CN | 101040735 | 9/2007 |
| CN | 102316758 | 1/2012 |
| CN | 102715706 B | 2/2015 |
| CN | 102726888 B | 8/2015 |
| CN | 104822284 | 8/2015 |
| CN | 107847007 A | 3/2018 |
| CN | 108495568 A | 9/2018 |
| CN | 108601418 A | 9/2018 |
| CN | 108601418 B | 1/2021 |
| EP | 0056953 A1 | 8/1982 |
| EP | 0056953 A2 | 8/1982 |
| EP | 0121026 A1 | 10/1984 |
| EP | 0534560 A1 | 3/1993 |
| EP | 2253238 A1 | 11/2010 |
| EP | 2283276 A1 | 2/2011 |
| EP | 2796064 A1 | 10/2014 |
| EP | 2278896 B1 | 1/2018 |
| EP | 2278897 B1 | 5/2018 |
| EP | 2283276 B1 | 5/2018 |
| FR | 2643794 A1 | 9/1990 |
| JP | 6270802 U | 5/1987 |
| JP | 62290402 A | 12/1987 |
| JP | 0499502 A | 3/1992 |
| JP | 3033166 U | 1/1997 |
| JP | 10502261 A | 3/1998 |
| JP | 10225305 A | 8/1998 |
| JP | 2000014402 A | 1/2000 |
| JP | 2001513379 A | 9/2001 |
| JP | 2000014410 A | 1/2002 |
| JP | 2002119498 A | 4/2002 |
| JP | 2002238611 A | 8/2002 |
| JP | 3092657 U | 3/2003 |
| JP | 2004222782 A | 8/2004 |
| JP | 2005029168 A | 2/2005 |
| JP | 2006288783 A | 10/2006 |
| TW | M299404 U | 10/2006 |
| WO | WO-9415494 A1 | 7/1994 |
| WO | WO-0115559 A1 | 3/2001 |
| WO | WO-2006050266 A2 | 5/2006 |
| WO | WO-2006060057 A2 | 6/2006 |
| WO | WO-2008101203 A1 | 8/2008 |
| WO | WO-2009062030 A1 | 5/2009 |
| WO | WO-2009134858 A1 | 11/2009 |
| WO | WO-2009134864 A3 | 11/2009 |
| WO | WO-2015042216 A1 | 3/2015 |
| WO | WO-2016191115 A1 | 12/2016 |
| WO | 2017095945 | 6/2017 |
| WO | WO-2017091769 A1 | 6/2017 |
| WO | WO-2017091769 A8 | 6/2017 |

OTHER PUBLICATIONS

"U.S. Appl. No. 12/114,022, Non Final Office Action dated Jun. 15, 2011", 8 pgs.
"U.S. Appl. No. 12/114,022, Notice of Allowance dated Aug. 10, 2011", 5 pgs.
"U.S. Appl. No. 12/114,022, Response filed Jun. 3, 2011 to Restriction Requirement dated May 5, 2011", 13 pgs.
"U.S. Appl. No. 12/114,022, Response filed Jul. 25, 2011 to Non Final Office Action dated Jun. 15, 2011", 12 pgs.
"U.S. Appl. No. 12/114,022, Restriction Requirement dated May 5, 2011", 6 pgs.
"U.S. Appl. No. 12/369,400, 312 Amendment filed Sep. 30, 2011", 2 pgs.
"U.S. Appl. No. 12/369,400, Examiner Interview Summary dated Aug. 19, 2011", 3 pgs.
"U.S. Appl. No. 12/369,400, Non Final Office Action dated Jun. 15, 2011", 6 pgs.
"U.S. Appl. No. 12/369,400, Notice of Allowance dated Sep. 7, 2011", 5 pgs.
"U.S. Appl. No. 12/369,400, PTO Response to Rule 312 Communication dated Oct. 14, 2011", 2 pgs.
"U.S. Appl. No. 12/369,400, Response filed Aug. 24, 2011 to Non Final Office Action dated Jun. 15, 2011", 12 pgs.
"U.S. Appl. No. 12/369,410, Examiner Interview Summary dated Aug. 8, 2011", 3 pgs.
"U.S. Appl. No. 12/369,410, Non Final Office Action dated May 11, 2011", 11 pgs.
"U.S. Appl. No. 12/369,410, Notice of Allowance dated Sep. 12, 2011", 8 pgs.
"U.S. Appl. No. 12/369,410, Response filed Aug. 10, 2011 to Non Final Office Action dated May 11, 2011", 12 pgs.
"U.S. Appl. No. 13/236,221, Non Final Office Action dated Feb. 7, 2013", 8 pgs.
"U.S. Appl. No. 13/236,221, Notice of Allowance dated May 14, 2013", 6 pgs.
"U.S. Appl. No. 13/236,221, Response filed May 7, 2013 to Non Final Office Action dated Feb. 7, 2013", 12 pgs.
"U.S. Appl. No. 13/243,236, Examiner Interview Summary dated May 9, 2013", 3 pgs.
"U.S. Appl. No. 13/243,236, Non Final Office Action dated Feb. 12, 2013", 8 pgs.
"U.S. Appl. No. 13/243,236, Notice of Allowance dated May 23, 2013", 6 pgs.
"U.S. Appl. No. 13/243,236, Response filed May 13, 2013 to Non Final Office Action dated Feb. 12, 2013", 12 pgs.
"U.S. Appl. No. 13/955,007, Non Final Office Action dated Dec. 26, 2013", 8 pgs.
"U.S. Appl. No. 13/955,007, Notice of Allowance dated May 1, 2015", 8 pgs.
"U.S. Appl. No. 13/955,007, Response filed Mar. 12, 2014 to Non Final Office Action dated Dec. 26, 2013", 12 pgs.
"U.S. Appl. No. 14/310,586, Advisory Action dated Jan. 23, 2015", 3 pgs.
"U.S. Appl. No. 14/310,586, Final Office Action dated Nov. 14, 2014", 9 pgs.
"U.S. Appl. No. 14/310,586, Non Final Office Action dated May 27, 2015", 9 pgs.
"U.S. Appl. No. 14/310,586, Notice of Allowance dated Dec. 9, 2015", 5 pgs.
"U.S. Appl. No. 14/310,586, Response filed Jan. 20, 2015 to Final Office Action dated Nov. 14, 2014", 7 pgs.
"U.S. Appl. No. 14/310,586, Response filed May 15, 2015 to Restriction Requirement dated Mar. 16, 2015", 3 pgs.
"U.S. Appl. No. 14/310,586, Response filed Nov. 23, 2015 to Non Final Office Action dated May 27, 2015", 10 pgs.
"U.S. Appl. No. 14/310,586, Restriction Requirement dated Mar. 16, 2015", 6 pgs.
"U.S. Appl. No. 14/723,972, Examiner Interview Summary dated Jul. 3, 2018", 2 pgs.
"U.S. Appl. No. 14/723,972, Final Office Action dated Sep. 7, 2017", 16 pgs.
"U.S. Appl. No. 14/723,972, Final Office Action dated Oct. 9, 2018", 12 pgs.
"U.S. Appl. No. 14/723,972, Non Final Office Action dated Feb. 1, 2017", 10 pgs.
"U.S. Appl. No. 14/723,972, Non Final Office Action dated Mar. 14, 2018", 12 pgs.

(56) References Cited

OTHER PUBLICATIONS

"U.S. Appl. No. 14/723,972, Response filed Jul. 3, 2017 to Non Final Office Action dated Feb. 1, 2017", 8 pgs.
"U.S. Appl. No. 14/723,972, Response filed Jul. 16, 2018 to Non Final Office Action dated Mar. 14, 2018", 7 pgs.
"U.S. Appl. No. 14/723,972, Response filed Jan. 8, 2018 to Final Office Action dated Sep. 7, 2017".
"U.S. Appl. No. 14/723,972, Response filed Dec. 10, 2018 to Frinal Office Action dated Oct. 9, 2018", 10 pgs.
"U.S. Appl. No. 14/723,972, Response filed Dec. 21, 2016 to Restriction Requirement dated Oct. 21, 2016", 5 pgs.
"U.S. Appl. No. 14/723,972, Restriction Requirement dated Oct. 21, 2016", 7 pgs.
"U.S. Appl. No. 14/950,785, Non Final Office Action dated Jul. 5, 2017", 8 pgs.
"U.S. Appl. No. 14/950,785, Notice of Allowance dated Oct. 26, 2017", 8 pgs.
"U.S. Appl. No. 14/950,785, Response filed Jun. 12, 2017 to Restriction Requirement dated Jan. 11, 2017", 6 pgs.
"U.S. Appl. No. 14/950,785, Response filed Oct. 5, 2017 to Non Final Office Action dated Jul. 5, 2017", 8 pgs.
"U.S. Appl. No. 14/950,785, Restriction Requirement dated Jan. 11, 2017", 4 pgs.
"U.S. Appl. No. 15,365,047, Response filed Dec. 26, 2018 to Non Final Office Action dated Sep. 26, 2018", 8 pgs.
"U.S. Appl. No. 15/059,385, Non Final Office Action dated Jul. 6, 2017", 12 pgs.
"U.S. Appl. No. 15/059,385, Notice of Allowance dated Dec. 13, 2017", 7 pgs.
"U.S. Appl. No. 15/059,385, Response filed Jun. 16, 2017 to Restriction Requirement dated Jan. 17, 2017", 7 pgs.
"U.S. Appl. No. 15/059,385, Response filed Nov. 6, 2017 to Non Final Office Action dated Jul. 6, 2017", 10 pgs.
"U.S. Appl. No. 15/059,385, Restriction Requirement dated Jan. 17, 2017", 6 pgs.
"U.S. Appl. No. 15/365,047, Examiner Interview Summary dated Nov. 8, 2018", 3 pgs.
"U.S. Appl. No. 15/365,047, Non Final Office Action dated Sep. 26, 2018", 12 pgs.
"U.S. Appl. No. 15/365,047, Notice of Allowability dated Sep. 5, 2019", 2 pgs.
"U.S. Appl. No. 15/365,047, Notice of Allowance dated Jul. 10, 2019", 10 pgs.
"Chinese Application Serial No. 200980115809.6, Decision to Grant dated Oct. 31, 2012", with English Translation, 2 pgs.
"Chinese Application Serial No. 200980115809.6, Office Action dated May 21, 2012", with English translation of claims, 9 pgs.
"Chinese Application Serial No. 200980115809.6, Response filed Sep. 29, 2012 to Office Action dated May 21, 2012", with English translation of claims, 7 pgs.
"Chinese Application Serial No. 200980125209.8, Decision to Grant dated Jan. 28, 2014", with English Translation, with English Translation, 2 pgs.
"Chinese Application Serial No. 200980125209.8, Office Action dated Jun. 20, 2013", with English translation of claims, with English Translation, 21 pgs.
"Chinese Application Serial No. 200980125209.8, Response filed Nov. 5, 2013 to Office Action dated Jun. 20, 2013", with machine translation, 62 pgs.
"Chinese Application Serial No. 200980125531.0, Decision to Grant dated Feb. 13, 2014", English translation, 2 pgs.
"Chinese Application Serial No. 200980125531.0, Office Action dated Jan. 25, 2013", with English translation of claims, 8 pgs.
"Chinese Application Serial No. 200980125531.0, Office Action dated Jun. 1, 2012", with English translation of claims, 14 pgs.
"Chinese Application Serial No. 200980125531.0, Office Action dated Aug. 5, 2013", with English translation of claims, 12 pgs.
"Chinese Application Serial No. 200980125531.0, Response filed Apr. 9, 2013 to Office Action dated Jan. 25, 2013", with English translation of claims, 29 pgs.
"Chinese Application Serial No. 200980125531.0, Response filed Oct. 12, 2012 to Office Action dated Jun. 1, 2012", with English translation of claims, 14 pgs.
"Chinese Application Serial No. 200980125531.0, Response filed Nov. 5, 2013 to Office Action dated Aug. 5, 2013", with machine translation, 10 pgs.
"Chinese Application Serial No. 201210233338.2, Office Action dated May 6, 2014", W/ English Translation, 18 pgs.
"Chinese Application Serial No. 201210233338.2, Office Action dated Dec. 31, 2014", W/ English Translation, 7 pgs.
"Chinese Application Serial No. 201210233338.2, Response filed Sep. 22, 2014 to Office Action dated May 6, 2014", with English translation of claims, 8 pgs.
"Chinese Application Serial No. 20121023338.2, Response filed Mar. 16, 2015", with English translation, 3 pgs.
"Chinese Application Serial No. 201210234324.2, Decision to Grant dated Nov. 15, 2014", English translation, 2 pgs.
"Chinese Application Serial No. 201210234324.2, Office Action dated Mar. 24, 2014", with English translation of claims, 15 pgs.
"Chinese Application Serial No. 201210234324.2, Response filed Aug. 8, 2014 to Office Action dated Mar. 24, 2014", with English translation of claims, 28 pgs.
"Chinese Application Serial No. 201680080503.1, Voluntary Amendment filed Jan. 24, 2019", w/ English claims, 14 pgs.
"European Application Serial No. 09739660.0, Extended European Search Report dated Nov. 28, 2013", 9 pgs.
"European Application Serial No. 09739660.0, Invitation Pursuant to Rule 62a(1) EPC and Rule 63(1) EPC dated Aug. 22, 2013", 3 pgs.
"European Application Serial No. 09739660.0, Response filed Feb. 20, 2014 to Extended European Search Report dated Nov. 28, 2013", 30 pgs.
"European Application Serial No. 09739660.0, Response filed Oct. 4, 2013", 1 pg.
"European Application Serial No. 09739662.6, Intention to Grant dated Jan. 5, 2018", 55 pgs.
"European Application Serial No. 09739662.6, Response filed Jul. 16, 2014 to Extended European Search Report dated Mar. 13, 2014", 19 pgs.
"European Application Serial No. 09739662.6. Extended European Search Report dated Mar. 13, 2014", 8 pgs.
"European Application Serial No. 09739666.7, Extended European Search Report dated Feb. 18, 2014", 6 pgs.
"European Application Serial No. 09739666.7, Response filed May 8, 2012", 1 pg.
"European Application Serial No. 09739666.7, Response filed May 9, 2014", 20 pgs.
"European Application Serial No. 14160429.8, Decision to grant dated Jan. 8, 2016", English translation, 2 pgs.
"European Application Serial No. 14160429.8, Extended European Search Report dated Sep. 30, 2014", 4 pgs.
"European Application Serial No. 14160429.8, Intention to grant dated Jul. 24, 2015", 6 pgs.
"European Application Serial No. 14160429.8, Response filed Apr. 24, 2015 to Extended European Search Report dated Sep. 30, 2014", 8 pgs.
"European Application Serial No. 14160429.8, Response filed Nov. 24, 2015", with machine translations, 16 pgs.
"European Application Serial No. 16728443.9, Response filed Jul. 27, 2018 to Communication Pursuant to Rules 161 and 162 EPC dated Jan. 17, 2018", 20 pgs.
"European Application Serial No. 16871435.0, Extended European Search Report dated Jun. 5, 2019", 6 pgs.
"European Application Serial No. 16871435.0, Response filed Jan. 4, 2019 to Communication Pursuant to Rules 161 and 162 dated Jul. 13, 2018", 17 pgs.
"European Application Serial No. 18150821.9, Extended European Search Report dated Sep. 18, 2018", 7 pgs.
"International Application Serial No. PCT/US2009/042072, International Preliminary Report on Patentability dated Nov. 11, 2010", 10 pgs.
"International Application Serial No. PCT/US2009/042072, International Search Report dated Jul. 27, 2009", 2 pgs.

(56) References Cited

OTHER PUBLICATIONS

"International Application Serial No. PCT/US2009/042072, Written Opinion dated Feb. 14, 2012", 3 pgs.
"International Application Serial No. PCT/US2009/042072, Written Opinion dated Jul. 27, 2009", 8 pgs.
"International Application Serial No. PCT/US2009/042075, International Preliminary Report on Patentability dated Nov. 11, 2010", 7 pgs.
"International Application Serial No. PCT/US2009/042075, International Search Report dated Jul. 27, 2009", 2 pgs.
"International Application Serial No. PCT/US2009/042075, Written Opinion dated Jul. 27, 2009", 5 pgs.
"International Application Serial No. PCT/US2009/042081, International Preliminary Report on Patentability dated Mar. 15, 2012", 5 pgs.
"International Application Serial No. PCT/US2009/042081, International Search Report dated Feb. 14, 2012", 5 pgs.
"International Application Serial No. PCT/US2009/042081, Written Opinion dated Feb. 14, 2012", 3 pgs.
"International Application Serial No. PCT/US2016/032251, International Preliminary Report on Patentability dated Dec. 7, 2017", 10 pgs.
"International Application Serial No. PCT/US2016/032251, International Search Report dated Aug. 22, 2016", 4 pgs.
"International Application Serial No. PCT/US2016/032251, Written Opinion dated Aug. 22, 2016", 8 pgs.
"International Application Serial No. PCT/US2016/063670, International Preliminary Report on Patentability dated Jun. 7, 2018", 11 pgs.
"International Application Serial No. PCT/US2016/063670, International Search Report dated Mar. 17, 2017", 4 pgs.
"International Application Serial No. PCT/US2016/063670, Written Opinion dated Mar. 17, 2017", 9 pgs.
"International Application Serial No. PCT/US2016/064248, International Preliminary Report on Patentability dated Jun. 14, 2018", 9 pgs.
"International Application Serial No. PCT/US2016/064248, International Search Report dated Mar. 13, 2017", 3 pgs.
"International Application Serial No. PCT/US2016/064248, Written Opinion dated Mar. 13, 2017", 7 pgs.
"Japanese Application Serial No. 2011-507603, Decision to Grant dated Jul. 2, 2013", with English Translation, 6 pgs.
"Japanese Application Serial No. 2011-507603, Office Action dated Mar. 12, 2013", with English translation of claims, with English Translation, 6 pgs.
"Japanese Application Serial No. 2011-507603, Response filed Jun. 3, 2013 to Office Action dated Mar. 12, 2013", w/English Claims, 9 pgs.
"Japanese Application Serial No. 2011-507604, Decision to Grant dated Jan. 7, 2014", with English Translation, 6 pgs.
"Japanese Application Serial No. 2011-507604, Office Action dated Mar. 26, 2013", with English translation of claims, with English Translation, 4 pgs.
"Japanese Application Serial No. 2011-507604, Response filed Jun. 18, 2013 to Office Action dated Mar. 26, 2013", with English translation of claims, English Translation of Claims, 17 pgs.
"Japanese Application Serial No. 2011-507605, Decision to Grant dated Nov. 12, 2013", English translation, 6 pgs.
"Japanese Application Serial No. 2011-507605, Office Action dated May 14, 2013", with English translation of claims, with English Translation, 4 pgs.
"Japanese Application Serial No. 2011-507605, Office Action dated Sep. 10, 2013", with English translation of claims, with English Translation, 4 pgs.
"Japanese Application Serial No. 2011-507605, Response filed Aug. 8, 2013 to Office Action dated May 14, 2013", with English translation of claims, 14 pgs.
"Japanese Application Serial No. 2011-507605, Response filed Oct. 3, 2013 to Office Action dated Sep. 10, 2013", English translation of claims, 13 pgs.
"U.S. Appl. No. 16/837,810, Preliminary Amendment filed Apr. 2, 2020", 6 pgs.
"U.S. Appl. No. 15/953,621, Response filed Apr. 28, 2020 to Non Final Office Action dated Jan. 28, 2020", 8 pgs.
"Chinese Application Serial No. 201680080503.1, Office Action dated Apr. 9, 2020", w English translation, 10 pgs.
"U.S. Appl. No. 15/953,621, Final Office Action dated May 11, 2020", 14 pgs.
"European Application Serial No. 16871435.0, Response filed Dec. 18, 2019 to Extended European Search Report dated Jun. 5, 2019", 16 pgs.
"U.S. Appl. No. 15/953,621, Response filed Jan. 6, 2020 to Restriction Requirement dated Oct. 8, 2019", 7 pgs.
"U.S. Appl. No. 15/953,621, Non Final Office Action dated Jan. 28, 2020", 11 pgs.
"U.S. Appl. No. 15/953,621, Response filed Jul. 13, 2020 to Final Office Action dated May 11, 2020", 7 pgs.
"U.S. Appl. No. 15/953,621, Advisory Action dated Jul. 21, 2020", 3 pgs.
"U.S. Appl. No. 15/953,621, Examiner Interview Summary dated Jul. 30, 2020", 3 pgs.
"Chinese Application Serial No. 201680080503.1, Response filed Aug. 10, 2020 to Office Action dated Apr. 9, 2020", w English claims, 75 pgs.
"U.S. Appl. No. 15/953,621, Response filed Oct. 12, 2020 to Advisory Action dated Jul. 21, 2020", 7 pgs.
"U.S. Appl. No. 14/723,972, Advisory Action dated Dec. 27, 2018", 3 pgs.
"European Application Serial No. 16869306.7, Response filed Jan. 4, 2019 to Communication Pursuant to Rules 161 anti 162 dated Jul. 11, 2018", 14 pgs.
"European Application Serial No. 18150821.9, Response filed Apr. 17, 2019 to Extended European Search Report dated Sep. 18, 2018", 19 pgs.
"U.S. Appl. No. 14/723,972, Non Final Office Action dated May 17, 2019", 13 pgs.
"U.S. Appl. No. 14/723,972, Examiner Interview Summary dated Jun. 24, 2019", 3 pgs.
"Chinese Application Serial No. 201680079902.6, Voluntary Amendment filed Nov. 26, 2018", w English claims, 7 pgs.
"European Application Serial No. 16869306.7, Extended European Search Report dated Sep. 18, 2019", 8 pgs.
"Chinese Application Serial No. 201680079902.6, Office Action dated Sep. 12, 2019", w English translation, 9 pgs.
"U.S. Appl. No. 15/953,621, Restriction Requirement dated Oct. 8, 2019", 7 pgs.
"U.S. Appl. No. 15/885,953, Restriction Requirement dated Oct. 8, 2019", 4 pgs.
"U.S. Appl. No. 15/365,047, PTO Response to Rule 312 Communication dated Oct. 21, 2019", 2 pgs.
"U.S. Appl. No. 15/953,621, Final Office Action dated Dec. 22, 2020", 13 pgs.

* cited by examiner

ARTICLE OF FOOTWEAR AND CHARGING SYSTEM

PRIORITY APPLICATIONS

This application is a continuation of U.S. patent application Ser. No. 15/365,047, filed Nov. 30, 2016, which application claims the benefit of priority to U.S. Provisional Patent Application Ser. No. 62/260,938, filed on Nov. 30, 2015.

U.S. patent application Ser. No. 15/365,047 is also a continuation of and claims the benefit of priority to U.S. patent application Ser. No. 15/059,385, filed Mar. 3, 2016, now U.S. Pat. No. 9,943,139, which issued on Apr. 16, 2018, which application is a continuation of U.S. patent application Ser. No. 14/310,586, filed Jun. 20, 2014, now U.S. Pat. No. 9,307,804, issued on Apr. 12, 2016, which application is a continuation of U.S. patent application Ser. No. 13/955,007, filed Jul. 31, 2013, now U.S. Pat. No. 8,769,844, issued on Jul. 8, 2014, which application is a continuation of U.S. patent application Ser. No. 13/236,221, filed Sep. 19, 2011, now U.S. Pat. No. 8,522,456, issued on Sep. 3, 2013, which application is a divisional of U.S. patent application Ser. No. 12/114,022, filed May 2, 2008, now U.S. Pat. No. 8,046,937, issued on Nov. 1, 2011, all contents of which are incorporated herein by reference in their entireties.

BACKGROUND

The present embodiments relate generally to articles of footwear and include removable motorized adjustment systems.

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust the fit of the footwear, as well as permitting entry and removal of the foot from the void within the upper. Likewise, some articles of apparel may include various kinds of closure systems for adjusting the fit of the apparel.

SUMMARY

In one aspect, the present disclosure is directed to an article of footwear. The article of footwear comprising an upper and a sole structure and an automated tensioning system that is configured to adjust a tension level of the article of footwear from a first tension level to a second tension level, where the first tension level is greater than the second tension level. The article of footwear also includes a charging assembly. The charging assembly having an internal charging device and a housing. The article of footwear has a sensor, where the sensor provides information to the automated tensioning system when the charging assembly is connected to an external charging device. Furthermore, the automated tensioning system is configured to loosen the article of footwear from the first tension level to the second tension level when the automated tensioning system receives information from the sensor indicating that the charging assembly is connected to the external charging device.

In another aspect, the present disclosure is directed to a method of controlling an article of footwear including an upper, a sole structure, an interior cavity, an automated tensioning system, a battery, a charging assembly, and a sensor. The method comprises receiving information from the sensor, where the sensor is configured to detect a connection of the charging assembly with an external charging device, and detecting if the charging assembly is connected to the external charging device. The method also includes automatically loosening the article of footwear through an operation of the automated tensioning system if the sensor determines that the charging assembly is connected to the external charging device.

In another aspect, the present disclosure is directed to a kit of parts. The kit of parts includes an article of footwear with an upper, a sole structure, an interior cavity, an automated tensioning system, a battery, a charging assembly, and a first sensor. The external charging device is configured to connect with the charging assembly in order to charge the battery of the article of footwear, and the charging assembly includes a ferromagnetic material, such that the charging assembly can magnetically couple with the external charging device.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
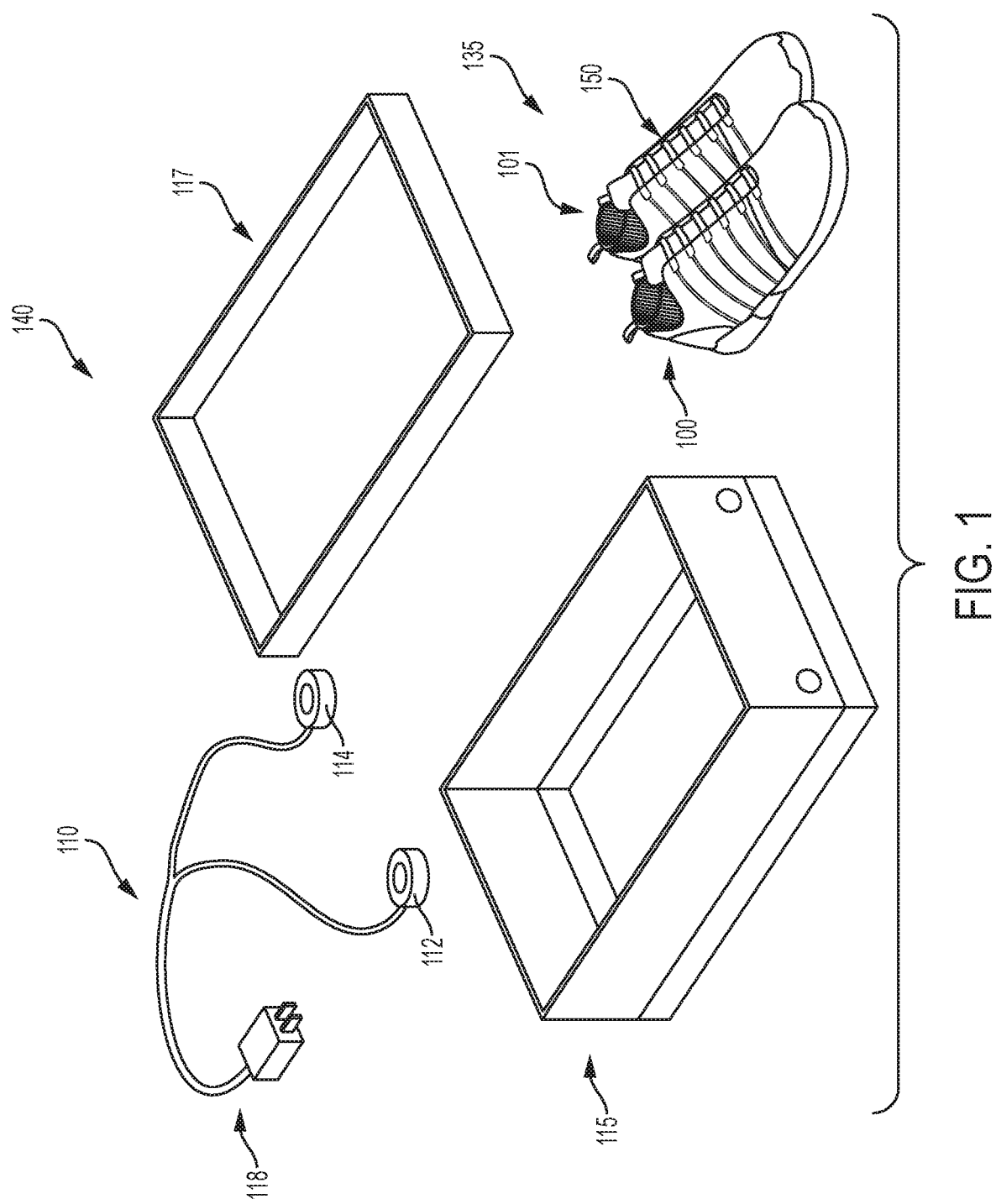
FIG. 1 is a schematic illustration of an embodiment of a kit of parts, including a charging system comprising a pair of footwear and a charging device.

The following discussion and accompanying figures disclose articles of footwear and a method of charging articles of footwear. Concepts associated with the footwear disclosed herein may be applied to a variety of athletic footwear types, including running shoes, basketball shoes, soccer shoes, baseball shoes, football shoes, and golf shoes, for example. Accordingly, the concepts disclosed herein apply to a wide variety of footwear types.

To assist and clarify the subsequent description of various embodiments, various terms are defined herein. Unless otherwise indicated, the following definitions apply throughout this specification (including the claims). For consistency and convenience, directional adjectives are employed throughout this detailed description corresponding to the illustrated embodiments.

The term "longitudinal," as used throughout this detailed description and in the claims, refers to a direction extending a length of a component. For example, a longitudinal direction of an article of footwear extends between a forefoot region and a heel region of the article of footwear. The term "forward" is used to refer to the general direction in which the toes of a foot point, and the term "rearward" is used to refer to the opposite direction, i.e., the direction in which the heel of the foot is facing.

The term "lateral direction," as used throughout this detailed description and in the claims, refers to a side-to-side direction extending a width of a component. In other words, the lateral direction may extend between a medial side and a lateral side of an article of footwear, with the lateral side of the article of footwear being the surface that faces away from the other foot, and the medial side being the surface that faces toward the other foot.

The term "side," as used in this specification and in the claims, refers to any portion of a component facing generally in a lateral, medial, forward, or rearward direction, as opposed to an upward or downward direction.

The term "vertical," as used throughout this detailed description and in the claims, refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" refers to the vertical direction heading away from a ground surface, while the term "downward" refers to the vertical direction heading toward the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

The "interior" of a shoe refers to space that is occupied by a wearer's foot when the shoe is worn. The "inner side" of a panel or other shoe element refers to the face of that panel or element that is (or will be) oriented toward the shoe interior in a completed shoe. The "outer side" or "exterior" of an element refers to the face of that element that is (or will be) oriented away from the shoe interior in the completed shoe. In some cases, the inner side of an element may have other elements between that inner side and the interior in the completed shoe. Similarly, an outer side of an element may have other elements between that outer side and the space external to the completed shoe. Further, the terms "inward" and "inwardly" shall refer to the direction toward the interior of the shoe, and the terms "outward" and "outwardly" shall refer to the direction toward the exterior of the shoe.

For purposes of this disclosure, the foregoing directional terms, when used in reference to an article of footwear, shall refer to the article of footwear when sitting in an upright position, with the sole facing groundward, that is, as it would be positioned when worn by a wearer standing on a substantially level surface.

In addition, for purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, or other joining techniques. In addition, two components may be "fixedly attached" by virtue of being integrally formed, for example, in a molding process.

For purposes of this disclosure, the term "removably attached" or "removably inserted" shall refer to the joining of two components or a component and an element in a manner such that the two components are secured together, but may be readily detached from one another. Examples of removable attachment mechanisms may include hook and loop fasteners, friction fit connections, interference fit connections, magnetic connections, threaded connectors, cam-locking connectors, compression of one material with another, and other such readily detachable connectors.

FIG. 1 illustrates an embodiment of a footwear charging system ("charging system") 140. As shown in FIG. 1, charging system 140 may be a kit of parts in some embodiments. The kit of parts may include a container 115 configured to store components of charging system 140. In different embodiments, charging system 140 may include a complementary pair of footwear ("pair") 135, comprising a first article of footwear ("first article") 100 and a second article of footwear ("second article) 101. For purposes of this discussion, a complementary pair of footwear refers to two articles of footwear that are designed to be worn as a pair by one user on a right foot and a left foot.

However, it should be understood that in other embodiments, the kit of parts comprising charging system 140 may be separate from complementary pair of footwear 135. Thus, in some cases, charging system 140 may be manufactured or configured separately from complementary pair of footwear 135. Furthermore, in some embodiments, charging system 140 may be utilized with a different pair of footwear.

Referring to FIG. 1, in some embodiments, charging system 140 may further include an external charging unit ("charging unit") 110. In different embodiments, charging unit 110 can include multiple components for connecting or contacting to various elements. In the embodiments depicted herein, charging unit 110 includes a first charging component ("first component") 112 and a second charging component ("second component") 114. In other embodiments, there may be only one charging component, or there may be additional charging components.

Furthermore, in some embodiments, charging unit 110 of charging system 140 can include provisions for receiving power from an external power source of some kind. In some embodiments, charging unit 110 can include a power cord 118 that is configured to receive power from an external power source. In one example, power cord 118 can be plugged into a wall socket. Power cord 118 can comprise a plug and cord (or cable) in some embodiments. In one embodiment, power cord 118 may be configured for use in a wide range of environments. Thus, power cord 118 may be connected to a standard AC power source or outlet (i.e., sockets) in some embodiments. In one embodiment, power cord 118 may connect with a 110-volt power supply. In another embodiment, power cord 118 may be configured for utilization with a range of voltages, including 110, 115, 120, 220, 230, or other standard residential voltages, and/or DC power. In some cases, power cord 118 may be adapted for industrial voltage use. Thus, charging unit 110 may be readily used in most of the locations where charging unit 110 may be transported or used. Charging unit 110 will be discussed further below with respect to FIG. 3.

As shown in FIG. 1, container 115 may be configured to contain or store complementary pair of footwear 135 as well as charging unit 110 that comprises charging system 140. In some embodiments, container 115 may be a box, such as a traditional shoebox or plastic resealable container, with a lid 117 or cover. For purposes of clarity, container 115 is illustrated here with a particular design. In FIG. 1, container 115 is illustrated as a generally three-dimensional rectangular shoebox. However, in other embodiments, container 115 can comprise any type of housing with the capacity for storing articles of footwear. For example, container 115 can comprise a bag that resembles a traditional duffle-type bag. Additionally, container 115 could be sized to fit a single pair of footwear, a single article of footwear, or multiple pairs of footwear, as well as other portions of charging system 140, in different embodiments. In other embodiments, however, container 115 could have any other design. In particular, container 115 could have another shape and/or size in other embodiments. Examples of other designs for a container include, but are not limited to, any type of box, receptacle, housing, platform, bags, and/or backpacks. Furthermore, the container could include any provisions for carrying the container, including any type of strap or handle. In embodiments including charging system 140, container 115 can include provisions for storing various systems or components associated with an article or charging component. In particular, in embodiments including an inductive charging system (see further below), container 115 can provide or be configured to hold or secure components of the inductive charging system that allow power to be transferred from an external power source to complementary pair of footwear 135.

In some embodiments, one or more parts of charging system 140 can include provisions for indicating the status of the charging system during use. In some cases, one or both articles of footwear comprising complementary pair of footwear 135 can include a visual indicator, such as a light, for indicating the charging status. In other cases, charging unit 110 can include a visual indicator, or can include a sound-based indicator, such as a speaker configured to produce a sound to indicate the charging status. In particular, charging indicators may be LED lights that are lit to indicate the charging status of an article of footwear in some embodiments. For example, if first article 100 is being charged alone, only one light associated with first article 100 may be lit. In another embodiment, if both articles of pair 135 are being charged, both a first light associated with first article 100 and a second light associated with second article 101 may be lit. Furthermore, the color of one or both charging indicators and/or any sounds may change depending on the status of the charging system. In different embodiments, charging indicators may be disposed along any portion of charging system 140. However, in other embodiments, such as those illustrated herein, there may be no charging indicators included in charging system 140.

For purposes of description, only one article of complementary pair of footwear 135 will be discussed in detail below. However, it should be understood that descriptions provided with reference to first article 100 may also be applicable to second article 101, including directional adjectives and the identification of general components (e.g., a sole structure and an upper) comprising each article. In other embodiments, it should be understood that first article 100 and second article 101 may include some differences in structure and/or design depending on the desired use or function of pair 135.

In different embodiments, one or both articles comprising pair 135 may be configured with an automated tensioning system ("tensioning system") 150. In the current embodiment, first article 100 is shown in the form of an athletic shoe, such as a running shoe. However, in other embodiments, tensioning system 150 may be used with any other kind of footwear including, but not limited to, hiking boots, soccer shoes, football shoes, sneakers, running shoes, cross-training shoes, rugby shoes, basketball shoes, baseball shoes as well as other kinds of shoes. Moreover, in some embodiments, tensioning system 150 may be configured for use with various kinds of non-sports-related footwear, including, but not limited to, slippers, sandals, high-heeled footwear, loafers as well as any other kinds of footwear. As discussed in further detail below, a tensioning system may not be limited to footwear, and in other embodiments, a tensioning system and/or components associated with a tensioning system could be used with various kinds of apparel, including clothing, sportswear, sporting equipment, and other kinds of apparel. In still other embodiments, a tensioning system may be used with braces, such as medical braces.

Figure 2:
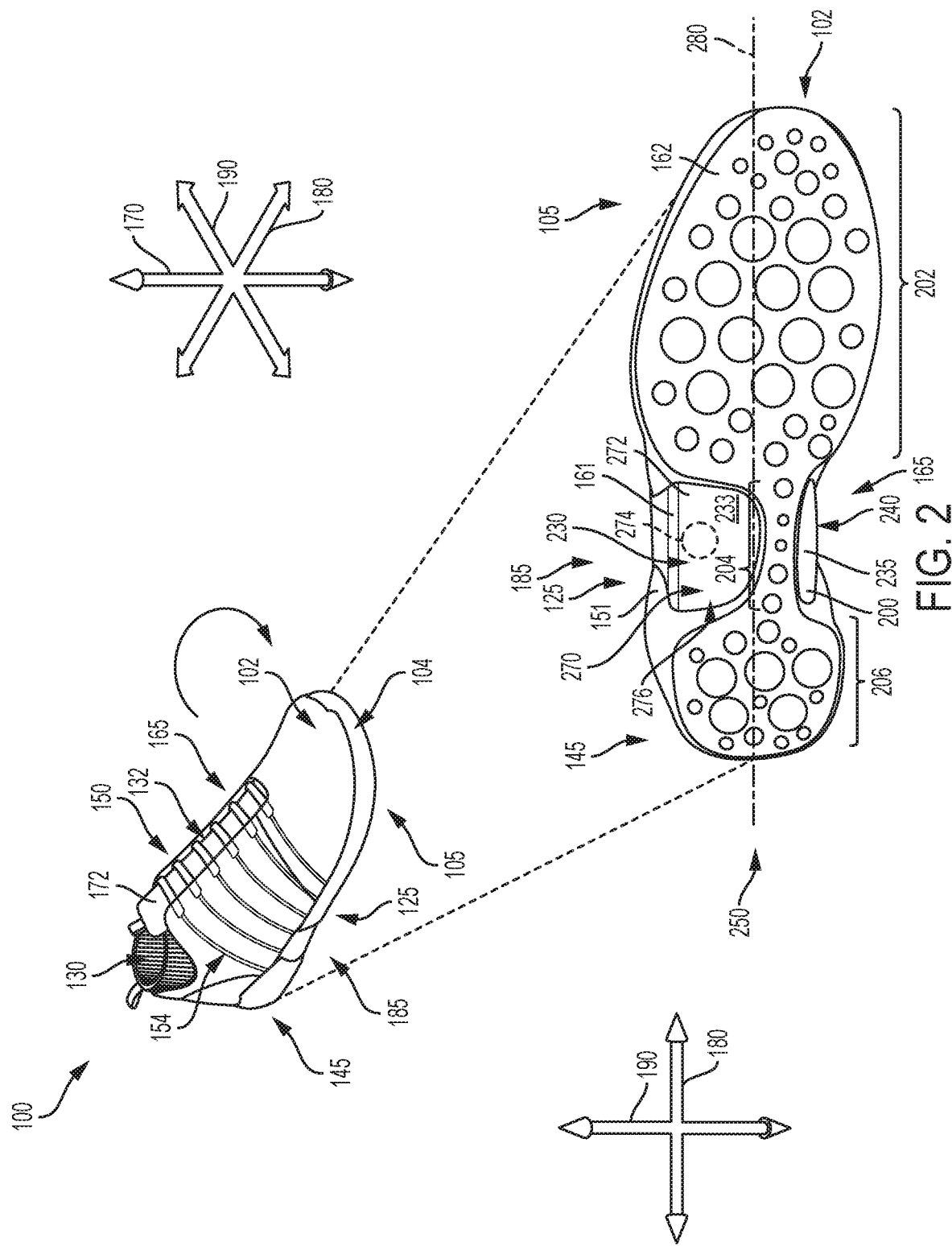
FIG. 2 is an isometric view of an embodiment of an article of footwear.

As noted above, for consistency and convenience, directional adjectives are employed throughout this detailed description. Referring now to FIG. 2, it can be seen that first article 100 may be divided into three general regions along a longitudinal axis 180: a forefoot region 105, a midfoot region 125, and a heel region 145. Forefoot region 105 generally includes portions of first article 100 corresponding with the toes and the joints connecting the metatarsals with the phalanges. Midfoot region 125 generally includes portions of first article 100 corresponding with an arch area of the foot. Heel region 145 generally corresponds with rear portions of the foot, including the calcaneus bone. Forefoot region 105, midfoot region 125, and heel region 145 are not intended to demarcate precise areas of first article 100.

Rather, forefoot region 105, midfoot region 125, and heel region 145 are intended to represent general relative areas of first article 100 to aid in the following discussion. Since various features of first article 100 extend beyond one region of first article 100, the terms forefoot region 105, midfoot region 125, and heel region 145 apply not only to first article 100 but also to the various elements or components comprising first article 100.

Referring to FIG. 2, for reference purposes, a lateral axis 190 of first article 100, and any components related to first article 100, may extend between a medial side 165 and a lateral side 185 of the foot. Additionally, in some embodiments, longitudinal axis 180 may extend from forefoot region 105 to heel region 145. It will be understood that each of these directional adjectives may also be applied to individual components of an article of footwear, such as an upper and/or a sole member. In addition, a vertical axis 170 refers to the axis perpendicular to a horizontal surface defined by longitudinal axis 180 and lateral axis 190.

In different embodiments, first article 100 may include upper 102 and sole structure 104. Generally, upper 102 may be any type of upper. In particular, upper 102 may have any design, shape, size, and/or color. For example, in embodiments where first article 100 is a basketball shoe, upper 102 could be a high-top upper that is shaped to provide high support on an ankle. In embodiments where first article 100 is a running shoe, upper 102 could be a low-top upper.

As shown in FIG. 2, upper 102 may include one or more material elements (for example, meshes, textiles, foam, leather, and synthetic leather), which may be joined to define an interior void configured to receive a foot of a wearer. The material elements may be selected and arranged to selectively impart properties such as light weight, durability, air permeability, wear resistance, flexibility, and comfort. Upper 102 may define an opening 130 through which a foot of a wearer may be received into the interior void.

In different embodiments, at least a portion of sole structure 104 may be fixedly attached to upper 102 (for example, with adhesive, stitching, welding, or other suitable techniques) and may have a configuration that extends between upper 102 and the ground. Sole structure 104 may include provisions for attenuating ground reaction forces (that is, cushioning and stabilizing the foot during vertical and horizontal loading). In addition, sole structure 104 may be configured to provide traction, impart stability, and control or limit various foot motions, such as pronation, supination, or other motions.

In some embodiments, sole structure 104 may be configured to provide traction for first article 100. In addition to providing traction, sole structure 104 may attenuate ground reaction forces when compressed between the foot and the ground during walking, running, or other ambulatory activities. The configuration of sole structure 104 may vary significantly in different embodiments to include a variety of conventional or non-conventional structures. In some cases, the configuration of sole structure 104 can be configured according to one or more types of ground surfaces on which sole structure 104 may be used.

For example, the disclosed concepts may be applicable to footwear configured for use on any of a variety of surfaces, including indoor surfaces or outdoor surfaces. The configuration of sole structure 104 may vary based on the properties and conditions of the surfaces on which first article 100 is anticipated to be used. For example, sole structure 104 may vary depending on whether the surface is harder or softer. In addition, sole structure 104 may be tailored for use in wet or dry conditions.

In some embodiments, sole structure 104 may be configured for a particularly specialized surface or condition. The proposed footwear upper construction may be applicable to any kind of footwear, such as basketball, soccer, football, and other athletic activities. Accordingly, in some embodiments, sole structure 104 may be configured to provide traction and stability on hard indoor surfaces (such as hardwood), soft, natural turf surfaces, or on hard, artificial turf surfaces. In some embodiments, sole structure 104 may be configured for use on multiple different surfaces.

As will be discussed further below, in different embodiments, sole structure 104 may include different components. In some embodiments, sole structure 104 may include multiple components, which may individually or collectively provide first article 100 with a number of attributes, such as support, rigidity, flexibility, stability, cushioning, comfort, reduced weight, or other attributes. In some embodiments, sole structure 104 may include an insole/sockliner, a cushioning layer, a midsole, and an outer sole member ("outsole") 162, which may have an exposed, ground-contacting lower surface. In some cases, however, one or more of these components may be omitted. In one embodiment, sole structure 104 may comprise a sole plate 161, as will be further discussed below.

Furthermore, in some embodiments, an insole may be disposed in the void defined by upper 102. The insole may extend through each of forefoot region 105, midfoot region 125, and heel region 145, and between lateral side 185 and medial side 165 of first article 100. The insole may be formed of a deformable (for example, compressible) material, such as polyurethane foams, or other polymer foam materials. Accordingly, the insole may, by virtue of its compressibility, provide cushioning, and may also conform to the foot in order to provide comfort, support, and stability.

In some embodiments, a midsole 151 may be fixedly attached to a lower area of upper 102 (for example, through stitching, adhesive bonding, thermal bonding (such as welding), or other techniques), or may be integral with upper 102. Midsole 151 may be formed from any suitable material having the properties described above, according to the activity for which first article 100 is intended. In some embodiments, midsole 151 may include a foamed polymer material, such as polyurethane (PU), ethyl vinyl acetate (EVA), or any other suitable material that operates to attenuate ground reaction forces as sole structure 104 contacts the ground during walking, running, or other ambulatory activities. In cases where midsole 151 has regions that are exposed along the exterior of the article, materials can be adjusted to provide greater resilience and structural support.

Furthermore, as shown in FIG. 2, first article 100 may include a tongue 172, which may be provided near or along a throat opening 132. In some embodiments, tongue 172 may be provided in or near an instep region of first article 100. However, in other embodiments, tongue 172 may be disposed along other portions of an article of footwear, or an article may not include a tongue. In addition, in some cases, sole structure 104 can include one or more cleat members or traction elements that are configured to increase traction with a ground surface.

As noted above, in different embodiments, first article 100 may include tensioning system 150. Tensioning system 150 may comprise various components and systems for adjusting the size of opening 130 leading to an interior void and tightening (or loosening) upper 102 around a wearer's foot. Some examples of different tensioning systems that can be used are disclosed in Beers et al., U.S. Patent Publication Number 2014/0070042 published Mar. 13, 2014, (previously U.S. patent application Ser. No. 14/014,555, filed Aug. 30, 2013) and entitled "Motorized Tensioning System with Sensors" and Beers et al., U.S. Pat. No. 8,056,269, issued Nov. 15, 2011 (previously U.S. Patent Publication Number 2009/0272013, published Nov. 5, 2009) and entitled "Article of Footwear with Lighting System," the disclosures of which are incorporated herein by reference in their entirety.

In some embodiments, tensioning system 150 may comprise one or more laces, as well as a motorized tensioning device. A lace may be configured to pass through various lacing guides 154 in some embodiments, which may be further associated with the edges of throat opening 132. In some cases, lacing guides 154 may provide a similar function to traditional eyelets on uppers. In particular, as a lace is pulled or tensioned, throat opening 132 may generally constrict so that upper 102 is tightened around a foot.

The arrangement of lacing guides 154 in the figures is only intended to be exemplary, and it will be understood that other embodiments are not limited to a particular configuration for lacing guides 154. Furthermore, the particular types of lacing guides 154 illustrated in the embodiments are also exemplary, and other embodiments may incorporate any other kinds of lacing guides or similar lacing provisions. In some other embodiments, for example, laces could be inserted through traditional eyelets. Some examples of lace guiding provisions that may be incorporated into the embodiments are disclosed in Cotterman et al., U.S. Patent Application Publication Number 2012/0000091, published Jan. 5, 2012 and entitled "Lace Guide," the disclosure of which is incorporated herein by reference in its entirety. Additional examples are disclosed in Goodman et al., U.S. Patent Application Publication Number 2011/0266384, published Nov. 3, 2011 and entitled "Reel Based Lacing System," the disclosure of which is incorporated herein by reference in its entirety. Still an additional example of lace guides is disclosed in Kerns et al., U.S. Patent Application Publication Number 2011/0225843, published Sep. 22, 2011 and entitled "Guides For Lacing Systems," the disclosure of which is incorporated herein by reference in its entirety.

Thus, in some embodiments, a lace may be passed through lacing guides 154. In other embodiments, a lace may pass through internal channels within upper 102 after entering channel openings that are near lacing guides 154. In some embodiments, internal channels extend around the sides of upper 102 and guide the lace toward a motorized tensioning device disposed in sole structure 104. In some cases, the motorized tensioning device may include provisions for receiving portions of a lace. In some cases, end portions of the lace can exit internal channels of upper 102 and can pass through apertures in a housing unit that contains a motorized tensioning device.

In some embodiments, a motorized tensioning device may generally be configured to automatically apply tension to a lace for purposes of tightening and loosening upper 102. A motorized tensioning device may thus include provisions for winding a lace onto, and unwinding a lace from, a spool internal to the motorized tensioning device. Moreover, the provisions may include an electric motor that automatically winds and unwinds the spool in response to various inputs or controls.

In FIG. 2, a bottom view 250 of first article 100 is also depicted near first article 100. Bottom view 250 includes a magnified view of outsole 162 and sole plate 161. Sole structure 104 includes outsole 162 joined to midsole 151, where midsole 151 is joined to or is disposed adjacent to sole plate 161. In different embodiments, outsole 162 may include a shape and size substantially similar to that of at least a portion of midsole 151. For example, in FIG. 2, it can be seen that outsole 162 extends over and covers a large portion of midsole 151. In other embodiments, outsole 162 may comprise a different shape or size. In one embodiment, outsole 162 may cover a smaller portion of midsole 151 than depicted here. In other embodiments, outsole 162 may be substantially larger than midsole 151.

For purposes of reference, the regions of overlap between outsole 162 and midsole 151 may be divided into a first portion 202, a bridge portion 204, and a second portion 206. In different embodiments, the shape of these portions can vary. In one embodiment, first portion 202 may resemble a generally elliptical or oval shape that is joined to an oblong rectangular-shaped second portion 206, where first portion 202 and second portion 206 are joined along a substantially rectangular-shaped bridge portion 204. Bridge portion 204 may be narrow relative to either first portion 202 or second portion 206. In other embodiments, the perimeter and shape of different portions of outsole 162 and midsole 151 may vary from what is depicted here, and include any regular or irregular shape.

Referring specifically to bridge portion 204 in FIG. 2, it may be noted that relative to a central longitudinal axis 280, bridge portion 204 can be disposed further toward one side versus another side. In FIG. 2, bridge portion 204 is arranged such that it is disposed along medial side 165 of sole structure 104. In other words, if it is understood that central longitudinal axis 280 represents a longitudinal midline of midsole 151, bridge portion 204 may be laterally offset with respect to central longitudinal axis 280. In another embodiment, bridge portion 204 may be disposed more centrally and/or extend across both sides of sole structure 104.

As a result of the shape and size of bridge portion 204, two "exposed regions" may be disposed on either side of bridge portion 204. As noted earlier, sole plate 161 may be at least partially exposed in the assembled sole structure. Thus, an underside 200 of sole plate 161 as shown herein can include one or more exposed regions. In FIG. 2, sole plate 161 includes two exposed regions, here referred to as a first region 230 and a second region 240.

In some embodiments, first region 230 may encompass or comprise a larger area than second region 240. For example, in FIG. 2, first region 230 has a first area 233 and second region 240 has a second area 235, where first area 233 is greater than second area 235. In other words, first region 230 and second region 240 may be asymmetric with respect to their degree of exposure. Thus, underside 200 of sole plate 161 is asymmetrically exposed, where medial side 165 of sole plate 161 is less exposed (or is smaller in area) than lateral side 185 of sole plate 161. However, it should be understood that in other embodiments, first area 233 may be substantially similar to or less than second area 235. For example, medial side 165 of sole plate 161 can be more exposed (or be larger in area) than lateral side 185 of sole plate 161 in some embodiments.

In some embodiments, outsole 161 may include provisions for storing, securing, holding, or otherwise housing a charging assembly 270 within sole structure 104. In one embodiment, charging assembly 270 can include one or more components configured to provide various electrical or mechanical functions to first article 100. For example, in FIG. 2, charging assembly 270 comprises a housing unit ("housing") 272. Housing 272 can contain or hold different mechanical or electrical components, such as circuitry, textiles, or other materials. In some embodiments, housing 272 may include various mechanisms or components that can be utilized in tensioning system 150. For example, within the interior of housing 272 there may be a battery (or other power source), circuitry (or other control mechanism), spools, gears, a motor, light sources, and/or other mechanisms. In one embodiment, housing 272 can include an internal charging device 274 that may facilitate the charging of tensioning system 150 in first article 100. In some embodiments, internal charging device 274 can be linked to or otherwise connected to an external charging system (such as charging unit 110 of FIG. 1) to transfer power to a battery associated with first article 100. In one embodiment, internal charging device 274 can comprise internal inductive loops that can be charged by an inductive charging system. In addition, in some embodiments, housing 272 can optionally include a securing element that can facilitate the connection of an external charging component with sole structure 104 (see FIGS. 8-10). For example, in some embodiments, there may be an attractive or a magnetic component disposed in housing 272 that can provide a securing mechanism with an external charging component, as will be discussed further below.

Furthermore, first article 100 may include provisions for detecting various changes in first article 100 or for the detection of connections of first article 100 to other external components. For example, some embodiments of first article 100 may utilize various kinds of devices for sending commands to the motorized tensioning system or other systems associated with first article 100. In some embodiments, first article 100 can incorporate one or more sensors for providing information to a motorized tensioning system that can trigger or initiate various commands. As one example, pressure sensors could be used under the insoles of an article to indicate when the user is standing. In another embodiment, a motorized tensioning system can be programmed to automatically loosen the tension of the lace when the user moves from the standing position to a sitting position, a movement detected by the use of a sensor. In other embodiments, various features of a motorized tensioning system may turn on or off, or adjust the tension of a lace, in response to information from a sensor. However, in other embodiments, it will be understood that the use of any sensor may be optional.

In different embodiments, the sensors providing information might include, but are not limited to, pressure sensors in shoe insoles to detect standing and/or rate of motion, bend indicators, strain gauges, gyroscopes, and accelerometers. In some embodiments, instead of, or in addition to, maintaining an initial tension of the laces, the sensor information may be used to establish a new target tension. For example, pressure sensors could be used to measure contact pressures of the upper of an article of footwear against the foot of a wearer and automatically adjust to achieve a desired pressure.

Thus, housing 272 may include a sensor in some embodiments. In different embodiments, as will be discussed further below with respect to FIGS. 11 and 12, a sensor may detect and measure a relative change with respect to a connection that is created between charging assembly 270 and a component of the charging system. For purposes of this disclosure, the use of the term "connect" or "connection" in the context of the charging system, charging assembly and/or charging unit should be understood to mean a link that occurs between two devices or components that facilitates access or communication of a transfer of power or information related to the charging process. The link may occur as a result of the physical contact between two surfaces, but it may also be created through wireless signals or signals that do not require physical contact. The use of sensors will be discussed further with respect to FIGS. 11 and 12.

Thus, in different embodiments, first article 100 can be configured for use with an external charging unit. In some embodiments, the dimensions of the exposed regions of sole plate 161 (i.e., first region 230 or second region 240) may facilitate a connection with an external charging unit. Furthermore, sole structure 104 can include a recess 276 that is dimensioned to receive a portion of an external charging unit in different embodiments. In some embodiments, recess 276 can be formed or defined by portions of the surfaces of underside 200 of sole plate 161, outsole 162, and midsole 151. Recess 276 can have a first volume that is configured to receive, enclose, contain, or otherwise hold a portion of another device or component, as will be discussed further below. In addition, as will be discussed with respect to FIG. 4, the height of recess 276 can vary.

Figure 3:
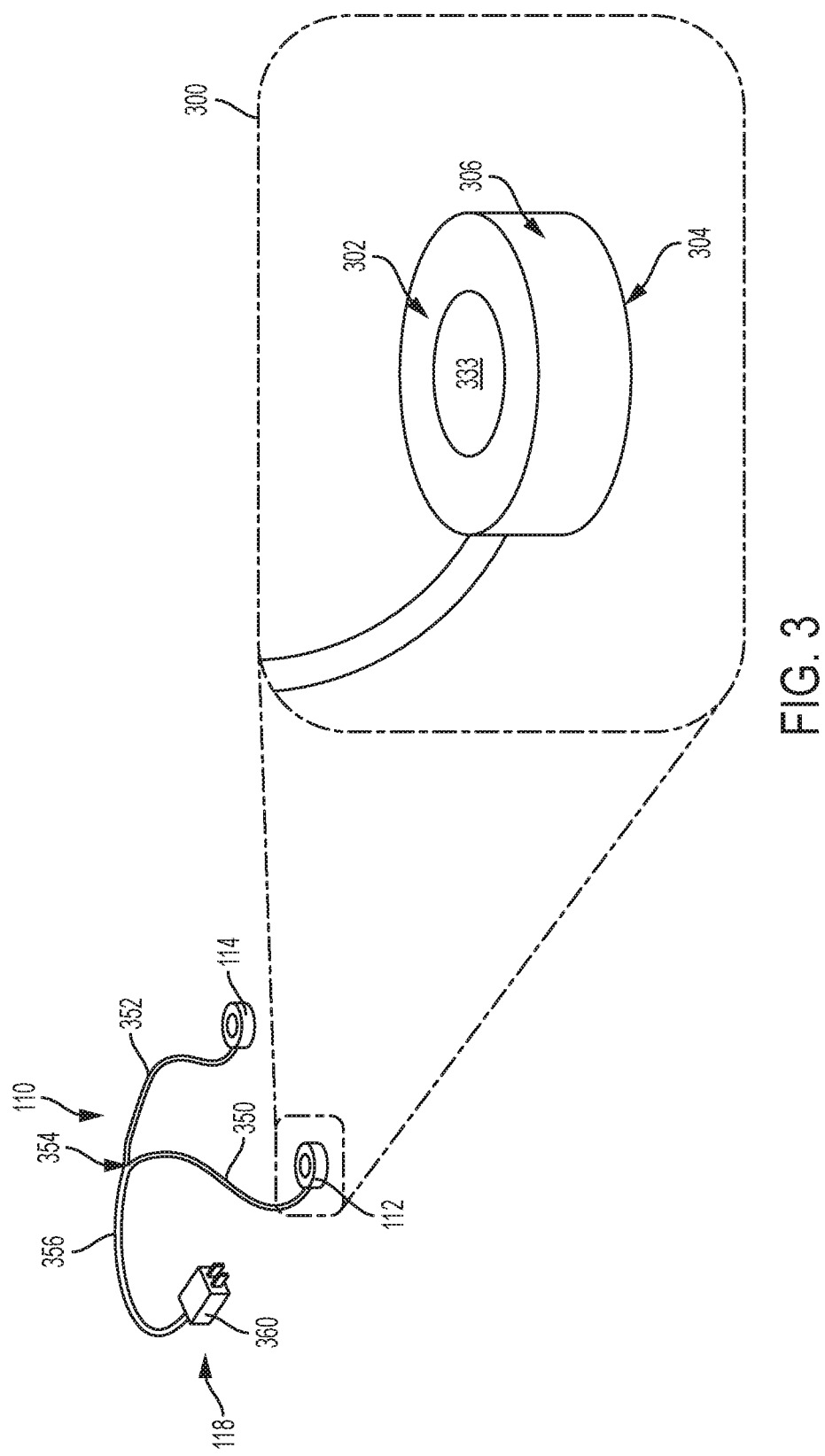
FIG. 3 is an illustration of an embodiment of a charging device.

As noted above with respect to FIG. 1, in different embodiments, charging system 140 may include charging unit 110 comprising first component 112 and second component 114. In some cases, charging unit 110 may facilitate the transfer of power to one or more articles of footwear. In other words, charging unit 110 may comprise a charging station and be configured to provide the functions of a charging system, as described above with respect to FIG. 1. Referring now to FIG. 3, in some embodiments, charging unit 110 may include provisions for transferring power to one or more articles of footwear. In some embodiments, a charging unit can include a central processing unit (CPU) of some kind. In other embodiments, a charging unit could comprise a simple circuit of some kind for receiving electrical inputs and providing an electrical output according to the inputs. In one embodiment, a charging unit may include a printed circuit board. Thus, in some cases, a charging unit may include a number of ports that facilitate the input and output of information and power. The term "port" means any interface or shared boundary between two conductors for purposes of this disclosure. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards. In one embodiment, the charging unit can include one or more ports configured to transfer power to an external inductive loop. It should be understood that the reference to an external inductive loop is with respect to an inductive loop that is external to an article of footwear. In other words, an external inductive loop may be enclosed or housed within a structure. For example, an external inductive loop can be disposed within a portion of first component 112 and/or second component 114, or some other portion of charging system 140. In some embodiments, an external inductive loop may be associated with an internal inductive loop of a corresponding article of footwear.

Thus, in different embodiments, external charging unit 110 that is utilized in charging system 140 may be configured for use with first article 100. In some embodiments, charging unit 110 can include components that are dimensioned to be connected to first article 100. For example, in one embodiment, one or more components of charging unit 110 can be dimensioned to be received by a portion of sole structure 104 (see FIG. 2). In particular, in some cases, a component can be dimensioned to fit or be received by recess 276 in sole structure 104 (see FIG. 2).

For purposes of illustration, the discussion herein will focus on first component 112. However, it should be understood that features and descriptions provided regarding first component 112 may be generally applicable to second component 114 in some embodiments. To better illustrate an embodiment of first component 112 for the reader, an isometric magnified view 300 of first component 112 is included in FIG. 3.

First component 112 may have a housing structure that can comprise different shapes in different embodiments. In some embodiments, first component 112 may comprise a generally cylindrical geometry, including a top portion 302 associated with a top side, and a base portion 304 associated with a bottom side, as well as a continuous, curved surface 306 extending between top portion 302 and base portion 304. Top portion 302 and base portion 304 are depicted as generally circular in FIG. 3. However, in other embodiments, the dimensions and/or shape of top portion 302, base portion 304, and/or curved surface 306 may differ, including but not limited to oblong, triangular, square, rectangular, oval, elliptical, or other regular or irregular shapes. Thus, in different embodiments, first component 112 can have a spherical, prism, cone, pyramidal, cuboid, or other regular or irregular geometry. In some embodiments, the geometry of first component 112 or the shapes of one or more of its surfaces may be configured to correspond or match with a portion of first article 100, as will be discussed further below.

In different embodiments, the texture of the outer surfaces comprising first component 112 may be smooth or generally untextured surfaces. However, in other embodiments, some surfaces can exhibit textures or other surface characteristics, such as dimpling, protrusions, ribs, ridges, securing elements, nubs, or various patterns, for example. In some cases, first component 112 can include one or more locating or structural features to facilitate alignment of first component 112 within charging system 140. In particular, in embodiments using an inductive charging system, it may be necessary to ensure proper alignment of internal inductive loops disposed within each article with any external inductive loops disposed in charging unit 110.

It should be understood that in other embodiments, other types of locating features may be used. For example, in some cases, top portion 302 can be configured with recesses that engage protrusions located on bottom surfaces of first region 230 of sole plate 161 (see FIG. 2). In other cases, top portion 302 can be configured with protrusions that engage recesses located on bottom surfaces of first region 230 of sole plate 161 (see FIG. 2). In still other embodiments, other types of locating features that are known in the art can be used. With these arrangements, an article can be maintained in a predetermined location with respect to first component 112. In particular, articles may be positioned in a manner that orients any internal inductive loops with any external inductive loops disposed within first component 112. However, in some embodiments, top portion 302 does not include locating features, and may be substantially smooth or flat.

In addition, different surfaces of first component 112 may comprise varying dimensions in some embodiments. In the embodiment of FIG. 3, it can be seen that top portion 302 has a third area 333 defined by a substantially round perimeter (or circumference). In the embodiments depicted herein, base portion 30 may have a substantially similar area to top portion 302. However, in other embodiments, top portion 302 may have a different sized area than base portion 304.

In addition, in some cases, the dimensions of first component 112 may be configured to accommodate a corresponding portion in an article of footwear, as noted above. In some embodiments, third area 333 may be substantially similar to or less that first area 233 (shown in FIG. 2). In other words, third area 333 may be the same or smaller than the exposed first region 230 of sole plate 161 in FIG. 2. In one embodiment, this may allow top portion 302 of first component 112 to be disposed flush against the surface of first region 230, as will be discussed in FIGS. 5-7.

Furthermore, first component 112 may include a second volume that can be substantially similar to or less that the first volume of recess 276 (shown in FIG. 2) in different embodiments. In other words, the second volume of first component 112 may be the same or smaller than the first volume associated with recess 276 of sole plate 161 in FIG. 2. In some embodiments, this can allow first component 112 to be disposed fully within the space bounded by recess 276, as will be discussed in FIGS. 5-7.

The interior of first component 112 may include different elements in various embodiments. For example, first component 112 (which comprises the housing that is generally defined by the various outer surfaces that have been described above) can encase one or more inductive loops, circuitry, wiring, or other charging components. Furthermore, as will be discussed below with respect to FIGS. 8-10, first component 112 can include a region or component that has a greater degree of magnetic attraction, such as a ferromagnetic material that can be disposed along the outer surface of first component 112, or in the interior of first component 112.

In some embodiments, top portion 302 and base portion 304 comprise substantially similar materials. In other embodiments, top portion 302 and base portion 304 can differ. For example, top portion 302 may include a region configured to improve or facilitate a connection to a sole structure. In addition, in one embodiment, base portion 304 may be generally smooth and/or flat. However, in other embodiments, base portion 304 may comprise undulations or bumps, or other types of texturing. In some cases, there may be traction elements disposed along base portion 304 to help anchor or secure first component 112, for example. Thus, in some embodiments, base portion 304 can include provisions for stability or grip on a ground surface.

Although the current embodiment generally describes an external inductive loop disposed in first component 112 of charging unit 110, other embodiments can include external inductive loops disposed in other portions of charging unit 110. Furthermore, while the current embodiment includes internal inductive loops disposed in a sole structure of an article of footwear, in other embodiments an internal inductive loop could be disposed in any other portion of an article of footwear. Examples of other portions that could house an internal inductive loop include, but are not limited to, a tongue, an upper sidewall, a forefoot portion of an upper, a heel portion of an upper, as well as any other portion of an article of footwear. In some embodiments, the location of an internal inductive loop in an article of footwear can be selected according to the location of an external inductive loop in a charging unit so that the internal inductive loop can be readily arranged adjacent to the external inductive loop when the article is inserted onto or placed adjacent to the charging unit, allowing inductive coupling (i.e., charging in an inductive based charging system) to occur.

Furthermore, in some embodiments, the outer housing associated with charging devices and charging components or other components of the charging system can be formed of various materials. In some embodiments, first component 112 can comprise different plastics, polymers, thermoplastic polyurethane (TPU), nylon, glass, carbon fiber, carbon composites, or other types of materials. In some embodiments, portions of a charging component may comprise a light-diffusive material.

As described above with respect to FIG. 1, charging unit 110 can include power cord 118 that is configured to receive power from an external power source. In different embodiments, first component 112 and/or second component 114 of charging unit 110 may be connected with, integral with, or fixedly attached to a first cable line 350 that is part of power cord 118, as shown in FIG. 3. For example, in one embodiment, first component 112 can contact, link, join, or be otherwise attached to first cable line 350. In some cases, first component 112 can include a port that connects first component 112 with first cable line 350. In different embodiments, the various portions of power cord 118 may comprise different lengths, dimensions, materials, and configurations, including any cables or cords known in the art. For example, in one embodiment, power cord 118 can comprise a Y-type cable, as shown in FIG. 3. In other words, there may be first cable line 350 extending from first component 112 and a second cable line 352 extending from second component 114. First cable line 350 and second cable line 352 can join at a central region 354, and extend toward a power adaptor 360 along a central cable line 356. Thus, in some embodiments, first component 112 and second component 114 may be configured to be moved or arranged independently of one another. In addition, first component 112 can be utilized by an article of footwear without a concurrent use of second component 114, for example.

As noted above, various portions of charging system 140 (see FIG. 1) can be configured to accommodate or connect to one another. For example, as described with reference to FIGS. 2 and 3, first component 112 and recess 276 may have dimensions that complement each other and facilitate the connection of first component 112 with charging assembly 270. In addition, in some embodiments, recess 276 can have a first volume that is greater than or substantially similar to the second volume of first component 112; similarly, first region 230 of recess 276 can have first area 233 that is greater to or substantially similar to third area 333 (see FIGS. 2 and 3).

Figure 4:
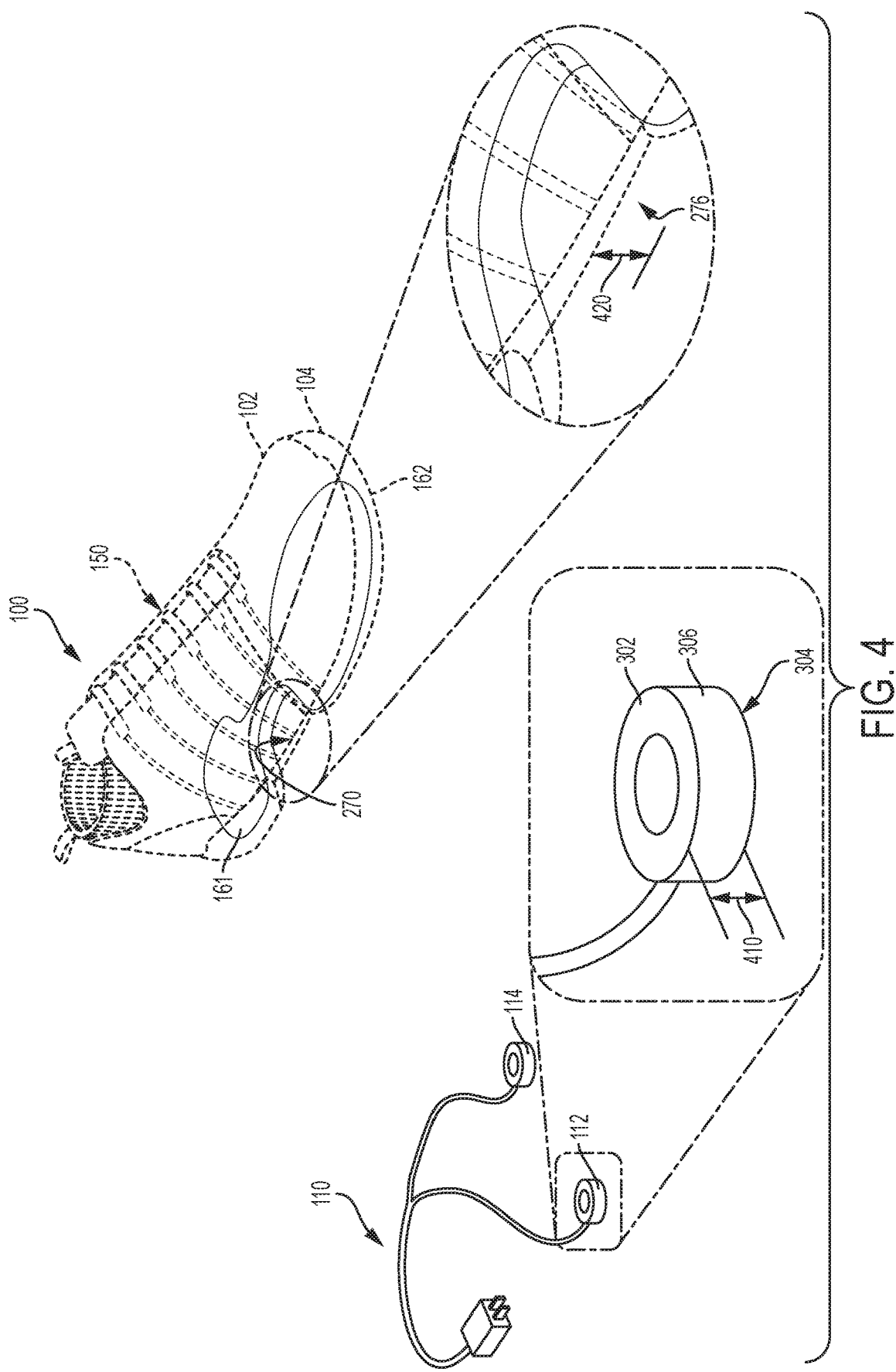
FIG. 4 is an isometric view of an embodiment of a charging system comprising a charging device and an article of footwear.

Referring now to FIG. 4, upper 102 and portions of sole structure 104 of first article 100 are shown in dotted line to reveal the dimensions of recess 276 relative to first component 112. First component 112 has a thickness 410 that extends between top portion 302 and base portion 304. Thickness 410 also generally corresponds to the width of curved surface 306 in FIG. 4. Similarly, recess 276 in sole structure 104 has a height 420. As shown in FIG. 4, in one embodiment, thickness 410 may be less than height 420. This difference in thickness can facilitate the link or association between first component 112 and an article of footwear in some embodiments, as will be discussed below. However, in other embodiments, thickness 410 may be substantially similar to height 420 or larger than height 420.

In one embodiment, thickness 410 may be generally consistent throughout first component 112, and height 420 may be generally consistent throughout recess 276. However, in other embodiments, there may be irregularities throughout first component 112 and/or sole structure 104, such that the thicknesses or height are not consistent. For example, in embodiments where first component 112 includes ridges or other irregularities along top portion 302, there may be corresponding irregularities in the thickness of first component. In such cases, thickness 410 may be understood to represent the maximum thickness of first component 410.

In some embodiments, due to the difference between thickness 410 and height 420 (as shown in FIG. 4), the upper surface of recess 276 (associated with the underside of sole plate 161 in first region 230, as shown in FIG. 2) may be spaced apart from top portion 302 of first component 112, such that there is no physical contact between the two surfaces. In other embodiments, due to the close or substantially similar value of height 420 and thickness 410, the upper surface of recess 276 may contact or press against the surface of top portion 302 of first component 112.

Thus, the various and dimensions of first component 112 sole structure 104 relative to one another can allow different surfaces associated with each to press or contact against each other. These correlations of dimension may permit first component 112 to more snugly join and/or be lodged within recess 276 formed along sole structure 104. However, in other embodiments, thickness 410 and height 420 may differ, and the two portions may be joined together in a different way.

Furthermore, in some embodiments, recess 276 can also accommodate an external charging component while ensuring first article 100 remains in a substantially normal position when disposed over the charging component. As described above, in some embodiments, the height of recess 276 may be greater than or substantially similar to the thickness of first charging component 112. In some cases, this can allow the bottom surface (e.g., outsole 162) of first article 100 to be generally flush or lie substantially flat against an indoor or outdoor ground surface when first article 100 is disposed over the charging component. This substantially level accommodation of the charging component may increase the ease-of-use, stability, and comfort during use of first article 100 with the charging system.

Figure 5:
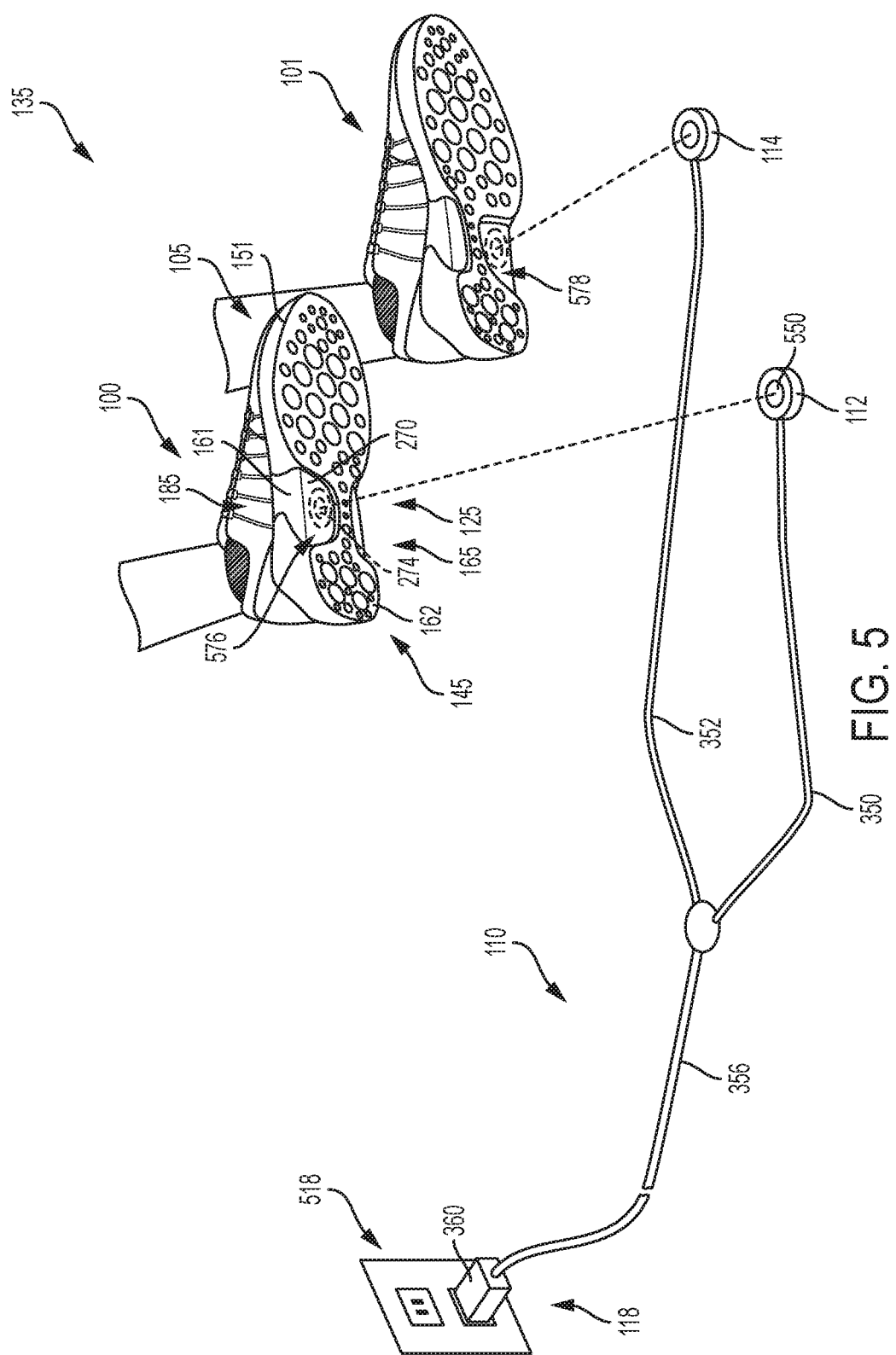
FIG. 5 is a schematic isometric view of an embodiment of a pair of footwear with a pair of charging devices.

Referring now to FIG. 5, an isometric view of pair 135, including first article 100 and second article 101, is illustrated adjacent to charging unit 110 that comprises first component 112 and second component 114. Power cord 118 of charging unit 110 is connected to a power source 518, allowing charging unit 110 to be activated and ready to receive pair 135. Dotted lines are included to represent an embodiment of a manner in which pair 135 may be subsequently aligned and positioned with respect to charging unit 110. As noted previously in FIG. 2, first article 100 can include midsole 151 and outsole 162. Furthermore, midsole 151 can be disposed adjacent to sole plate 161. Sole plate 161 includes a portion along midfoot region 125 that is an exposed outer surface (associated with first region 230 and second region 240 of FIG. 2). In FIG. 5, it can be seen that first article 100 has a first recess 576 and second article 101 has a second recess 578, which are each substantially similar to recess 276 discussed previously with respect to FIGS. 2-4.

As discussed above, in some embodiments, the correspondence between each of the two components of charging unit 110 and each of the recesses of pair 135 may allow the two surfaces to readily contact or adjoin one another. FIG. 5 depicts one embodiment of the manner in which both articles can be positioned with first component 112 and second component 114. In some embodiments, first article 112 may be mounted on either first component 112 or second component 114, and second article 114 may be mounted with either first component 112 or second component 114. However, in other embodiments, each component may be configured for use with only one article of pair 135.

In some embodiments, electricity received at an external power source can be transferred to the charging unit via power cord 118. In one embodiment, the electricity can then be transferred to an external inductive loop 550 disposed within first component 112. By using an external power source with an alternating current, power can be inductively transferred between the external inductive loop and the internal inductive loops of internal charging device 274 disposed in charging assembly 270 of sole structure 104. In particular, an alternating magnetic field can be created around the external inductive loop, which can induce a current in the corresponding internal inductive loop. This arrangement allows power to be transferred to a rechargeable power source, such as a battery, that may be disposed within first article 100, which can provide power for an automatic tensioning system.

It should be understood that the charging system described herein may differ in other ways. For example, the charging system of the present disclosure may include features of charging systems disclosed in Beers et al., U.S. Pat. No. 8,058,837, issued Nov. 15, 2011 (previously U.S. patent application Ser. No. 12/369,410, filed Feb. 11, 2009) and entitled "Charging System for an Article of Footwear," the entire disclosure of which is incorporated herein by reference.

Referring now to FIGS. 6-19, in different embodiments, charging unit 110 may be configured for use with pair 135. For purposes of illustration, the discussion herein will focus on first component 112 and first article 100. However, it should be understood that features and descriptions provided regarding first component 112 and first article 100 (as well as components associated with first article 100) may be generally applicable to second component 114 and second article 101 in different embodiments.

Figure 6:
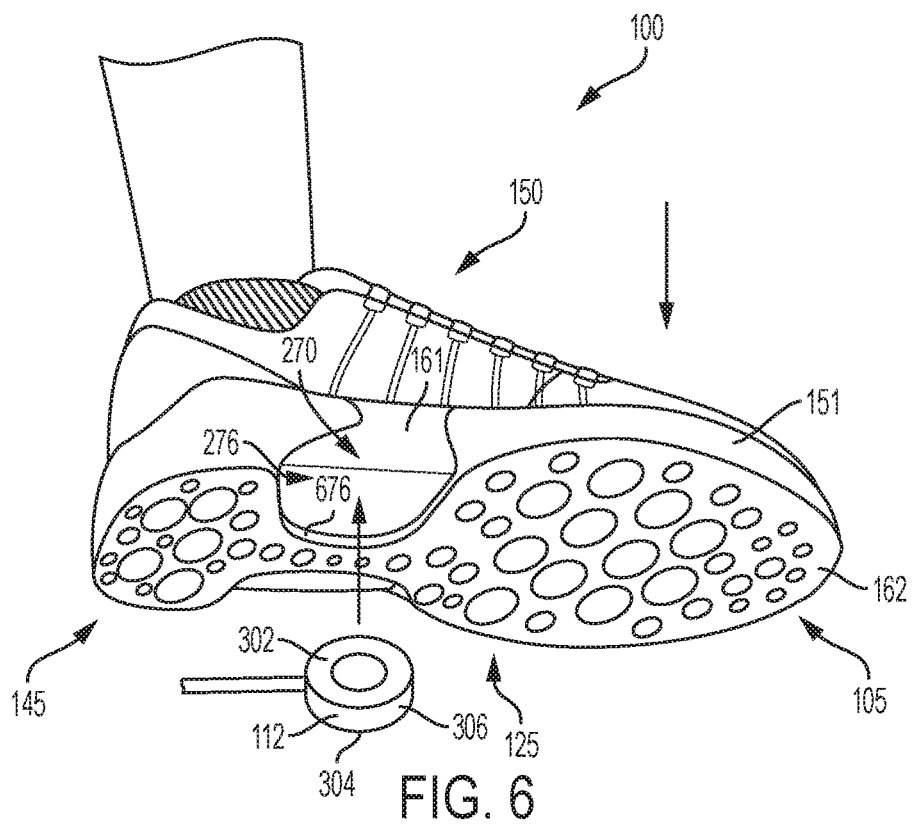
FIG. 6 is an isometric bottom-side view of an embodiment of an article of footwear with a portion of a charging device.
Figure 7:
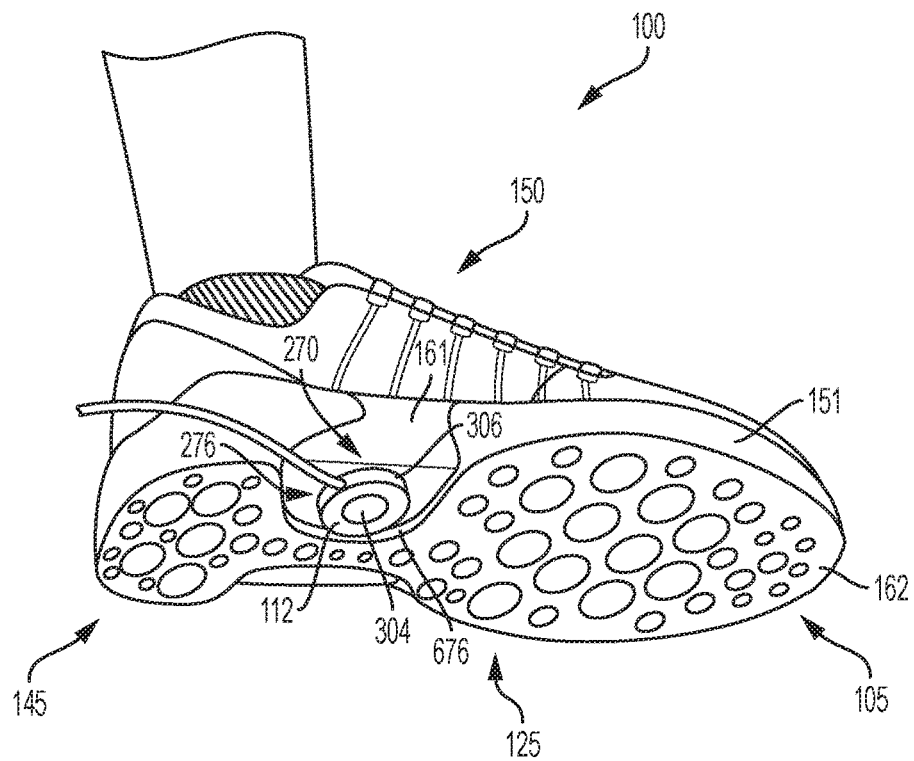
FIG. 7 is an isometric bottom-side view of an embodiment of an article of footwear with a portion of a charging device.

In FIGS. 6 and 7, an isometric bottom view of first article 100 is shown as first component 112 is mounted or installed. Thus, a portion of the exposed surface of first region 230 of sole plate 161 (as shown in FIG. 2) can be positioned such that it is disposed adjacent to top portion 302 of first component 112. In one embodiment, first component 112 can be received by recess 276 such that a portion of curved surface 306 can press or contact a side surface 676 of midsole 151. Furthermore, in some embodiments, the curvature of curved surface 306 may be substantially similar to the curvature of side surface 676 and improve the fit between the surfaces. In other words, the angle associated with the curve of side surface 676 may be substantially similar to the angle associated with the curve of curved surface 306. These types of correlations may permit first component 112 to more snugly join and/or be lodged or pressed against the surfaces comprising recess 276. However, in other embodiments, first component 112 and recess 276 may differ, and the two portions may be joined together in a different way. In particular, first article 100 may be positioned in a manner that orients any internal inductive loops with any external inductive loops disposed within first component 112.

As noted previously, with these arrangements, each article can be maintained in a predetermined location with respect to its charging units during charging, which is especially beneficial in embodiments that incorporate an inductive charging system. In order to facilitate the connection between first component 112 and first article 100, there may be additional provisions included in some embodiments. In different embodiments, various types of securing elements may be incorporated in article 100. Some of the embodiments disclosed herein may include one or more securing elements that can facilitate the connection between an article of footwear and a charging unit.

Figure 8:
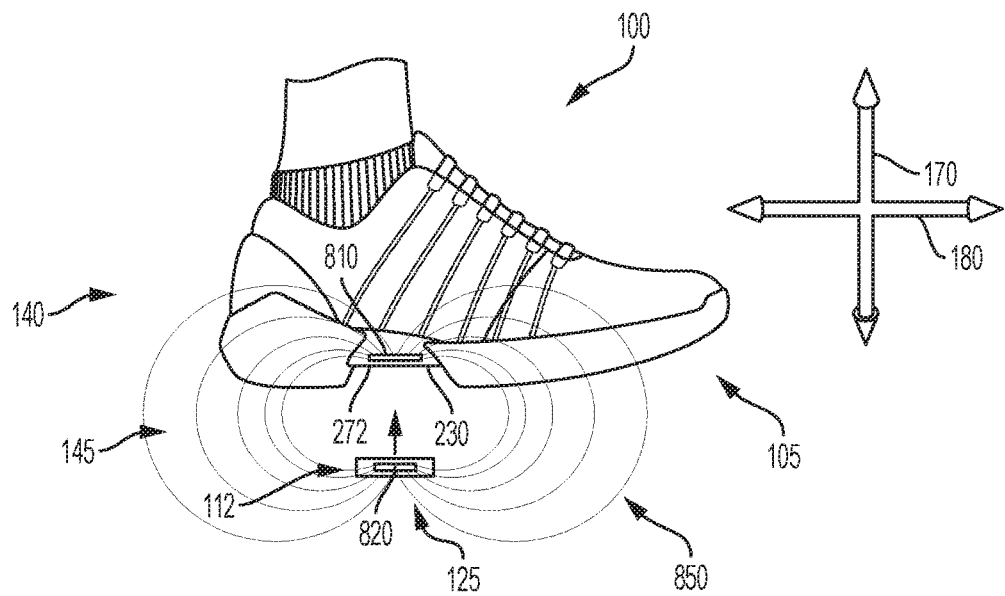
FIG. 8 is a schematic side view of an embodiment of an article of footwear and a portion of a charging device.
Figure 9:
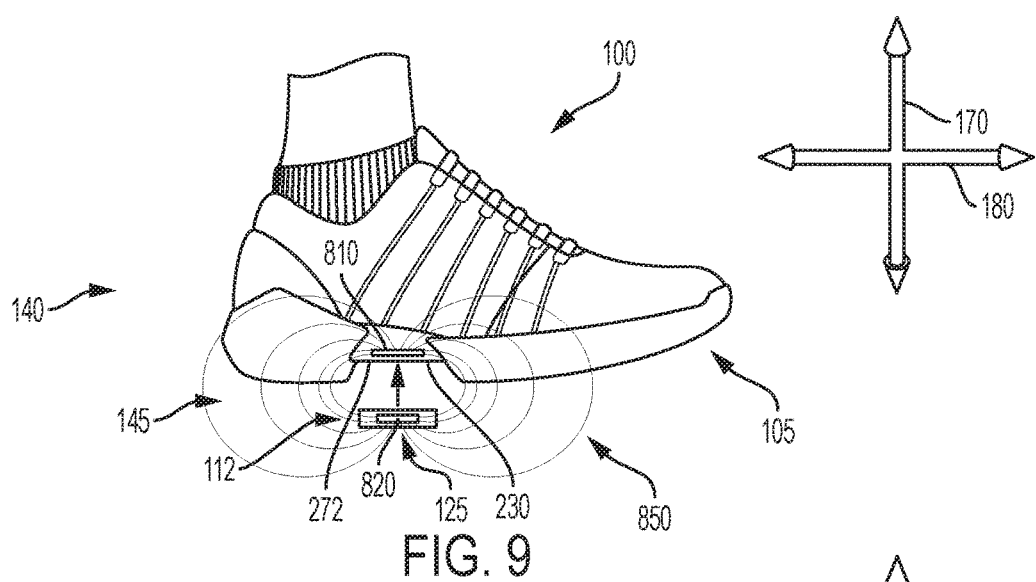
FIG. 9 is a schematic side view of an embodiment of an article of footwear and a portion of a charging device.
Figure 10:
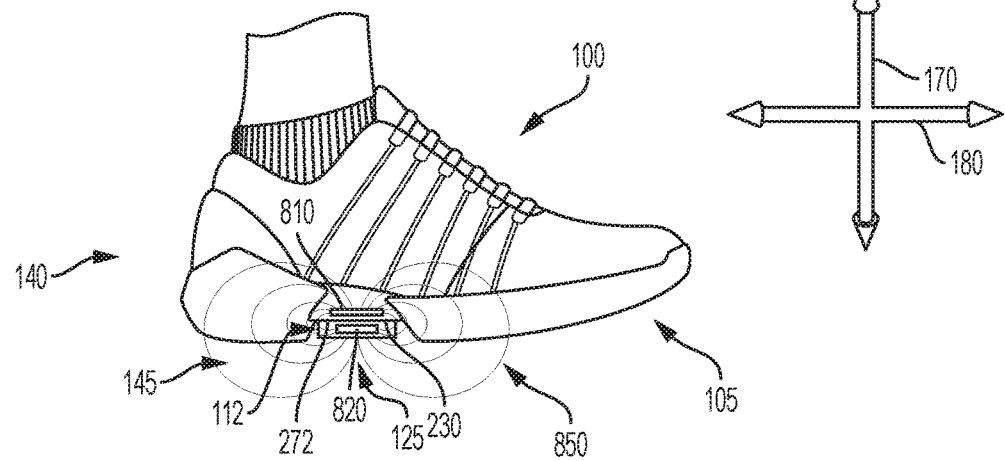
FIG. 10 is a schematic side view of an embodiment of an article of footwear and a portion of a charging device.

Referring to FIGS. 8-10, it can be seen that in some embodiments, securing element(s) may comprise a magnetic fastener or magnetic securing system. For example, in some embodiments, there may be magnetic materials incorporated into one or both of the articles of footwear and the charging unit. In some cases, the magnetic materials can correspond in position to the desired placement or positioning of the charging component relative to the sole structure. For example, in some cases, inductive loops disposed in first article 100 can be positioned to facilitate the charging of components if an inductive charging system is being used. Thus, in some embodiments, charging system 140 may include provisions to facilitate the alignment of internal inductive loops disposed within each article with any external inductive loops disposed in the charging unit. In some embodiments, "magnetic securing elements" can be utilized to help ensure the proper position of the charging component with the exposed surface of the sole structure comprising charging assembly 270.

In some embodiments, the securing elements can attract one another, depending upon their relative polarities. In one embodiment, there may be a magnetic coupling system included in charging system 140 with a first magnetic securing element ("first element") 810. One example of a magnetic coupling system is shown in the embodiments of FIGS. 8-10. In some cases, a ferromagnetic material (first element 810) can be provided within or adjacent to housing 272 of the charging assembly. Where the ferromagnetic material is formed as part of the material of housing 272, there need not be additional magnetically attractive materials in the sole structure, as housing 272 itself can attract a corresponding magnetic securing element. However, in some embodiments, there can instead (or also) be a ferromagnetic element (first element 810) that is disposed directly above first region 230 in sole structure 104. As one example, first element 810 can be a flat piece of metal inserted in housing 272 that may facilitate or strengthen the attachment of the charging component to the sole structure. In such cases, the metal piece comprising first element 810 can be made of a magnetically attractive material so as to enhance its ability to attract any magnet in the charging component (discussed below).

In some embodiments, there may be a second magnetic securing element ("second element") 820 disposed within or adjacent to first component 112. In some cases, second element 820 comprises a magnet-type material. Where the magnet is formed as part of the material of forming the structure of first component 112, there need not be additional magnetic components in first component 112. However, in some embodiments, there can instead (or also) be a magnetic element (second element 820) that is disposed within first component 112. As one example, second element 820 can be a magnet formed along the surface of first component 112 that may be attracted to ferromagnetic materials (such as first element 810).

In some embodiments, the charging component(s) and/or any associated magnets can be coated with a water-insulating material like rubber to protect it from everyday use in which an article of footwear may be dirty or covered with residual particles. In addition, the charging component(s) and magnetic portions can undergo oxidation to provide a water-insulating layer on the component.

In different embodiments, the size and/or weight of a magnetic securing element as discussed with respect to second element 820 should be such that it does not make the charging component too heavy but is nevertheless sufficiently strong in terms of its magnetic power so as to enable the charging component to be readily attracted to the article of footwear. In addition, in some embodiments, the magnetic attraction should be sufficient so that as a user subsequently removes his or her foot from the article of footwear, the connection is not displaced or interrupted (unless that is the intention of the user).

Attractive magnetic field 850 is schematically represented by a series of rings surrounding the illustration of first component 112 in FIGS. 8-10. Thus, when first element 810 is brought in proximity of second element 820, attractive magnetic field 850 may draw both portions toward one another, and/or generate a pulling force. Once the two portions are brought close enough to one another, the two elements can be pulled and held together securely by an attractive force, allowing for a magnetic connective force. In some cases, the magnetic connection is supplemented by different securing mechanisms, which can securely fix first element 810 alongside second element 820. Thus, even though first element 810 and second element 820 may not directly (i.e., physically) contact one another in some embodiments, they may nevertheless be securely and removably attached to one another through the proximity of first article 100 to first component 112. In one embodiment, a user may facilitate the coupling by stepping or moving toward charging component 112 while wearing first article 100, as shown in FIGS. 8-10.

Figure 11:
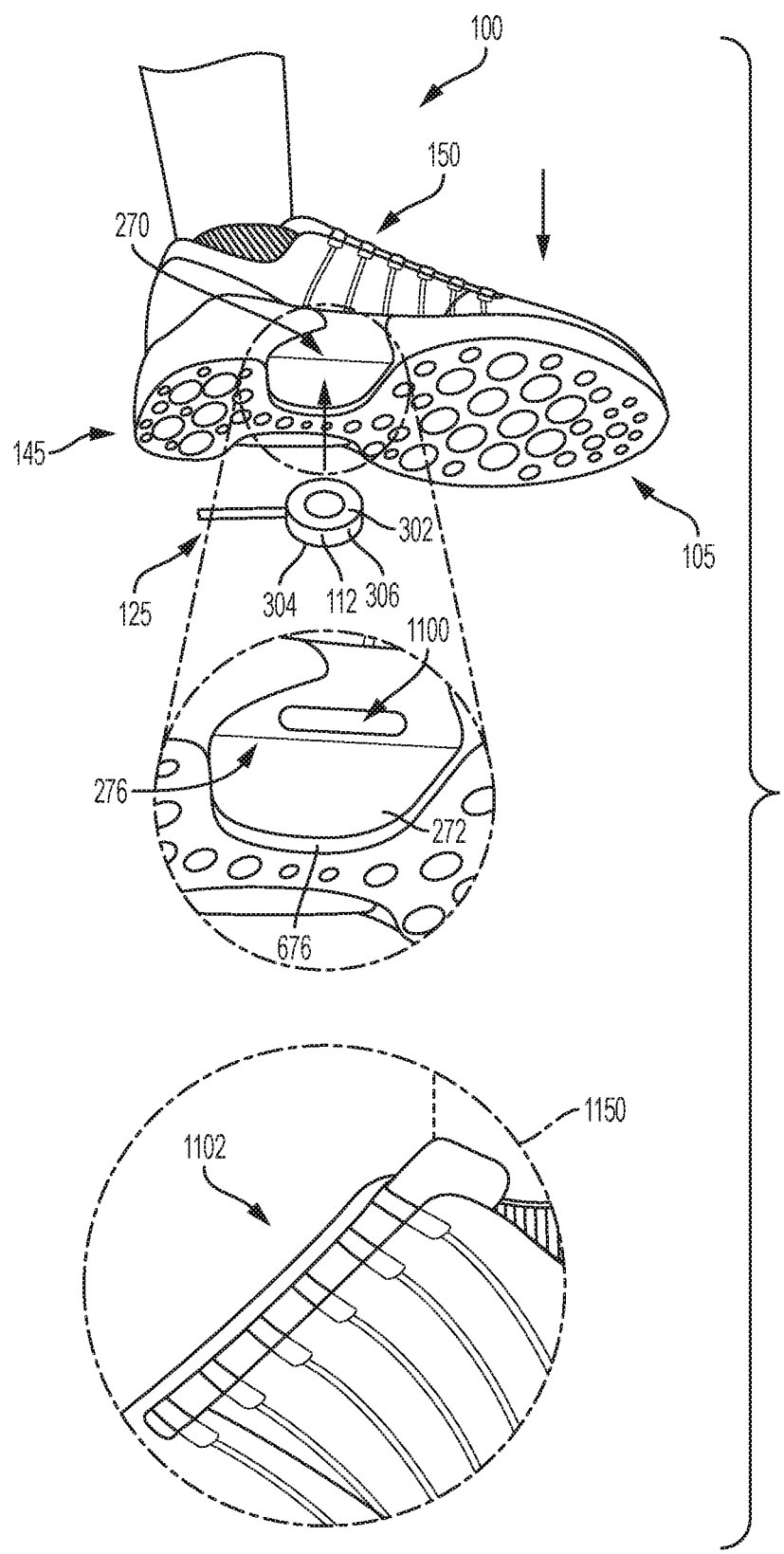
FIG. 11 is an isometric bottom-side view of an embodiment of an article of footwear with a portion of a charging device.
Figure 12:
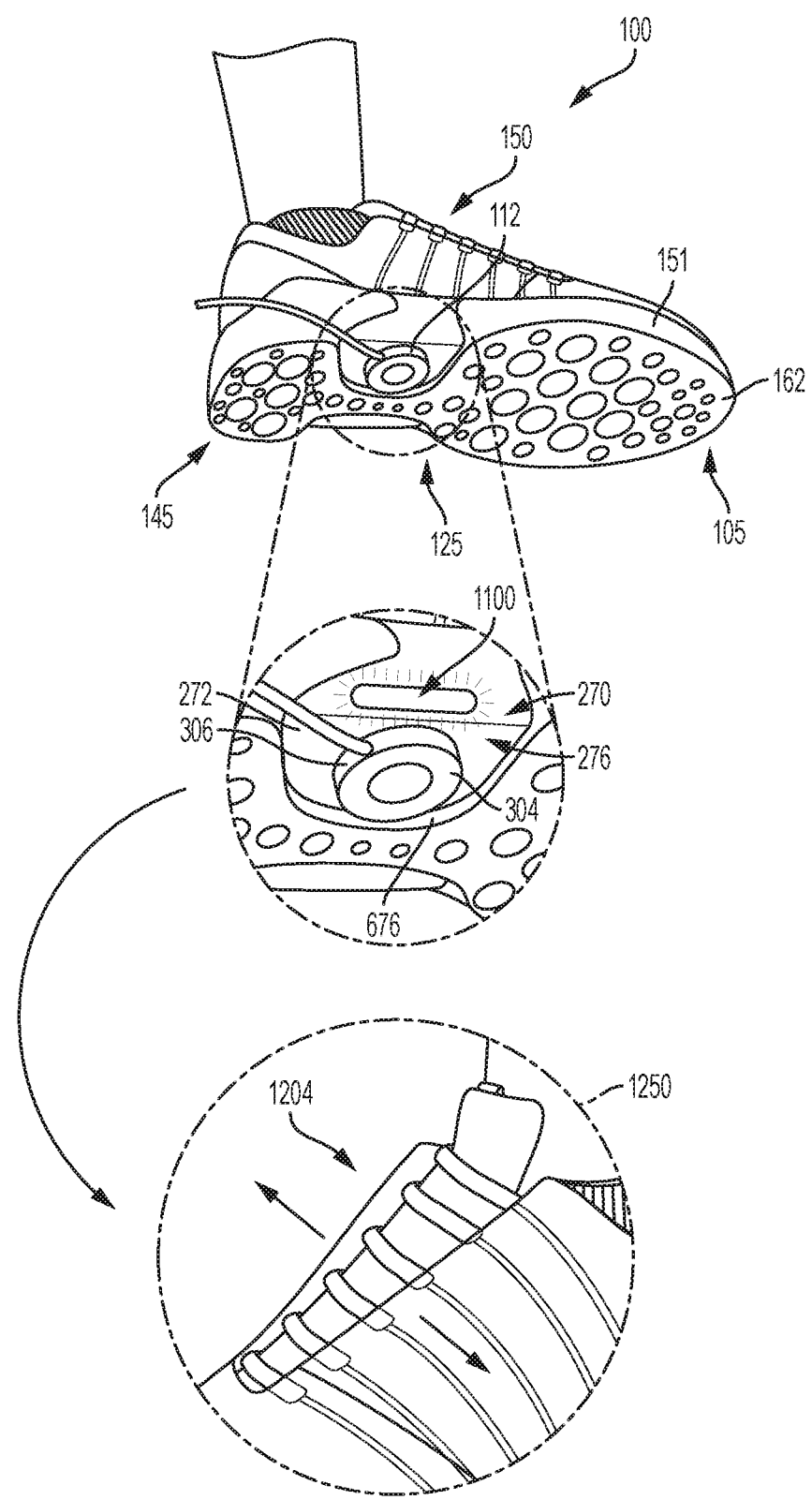
FIG. 12 is an isometric bottom-side view of an embodiment of an article of footwear with a portion of a charging device.

Referring now to FIGS. 11 and 12, a schematic view of an embodiment of two states associated with automated tensioning system 150 is depicted. In FIG. 11, first article 100 is shown in a laced state 1102, and in FIG. 12, first article 100 is shown in a fully unlaced state ("unlaced state") 1204. In terms of automated tensioning system 150, unlaced state 1204 represents a specific condition in which the article of footwear is fully unlaced (as loose as the system is configured to allow the article to become). In other embodiments, unlaced state 1204 may also represent a level of tension in which the system recognizes that the article of footwear is loosened to a particular level of tension or tightness that is preset by the system or desired by the user. In other words, unlaced state 1204 need not only represent the "fully unlaced" condition of the article of footwear, and may also be associated with a minimal amount of tension of the lacing system.

Furthermore, in some embodiments, laced state 1102 can represent a specific condition in which the system recognizes that the article of footwear is fully laced (as tightly as the system has been configured to allow the article to become). However, in some cases, laced state 1102 may also represent a condition in which the system recognizes that the article of footwear is laced to a particular level of tension or tightness that is desired by the user or preset by the system. In other words, laced state 1102 need not represent the "fully laced" condition of the article of footwear, and may also be associated with only a minimal amount of tension of the lacing system. However, laced state 1102 is understood to be a greater tension level than unlaced state 1204. In some embodiments, laced state 1102 can comprise all levels of tension associated with the automated tensioning system that are greater than the tension level of unlaced state unlaced state 1204.

As mentioned earlier, in some embodiments, different states or functions may be triggered by the activation of a sensor. In some embodiments, an auto-unlacing process may be initiated by the activation of a first sensor 1100. In some embodiments, first sensor 1100 may be disposed in an article of footwear. In some embodiments, first sensor 1100 can comprise a component that detects changes in magnetic forces, changes in infrared radiation, microwaves, or ultrasonics, contact with a particular surface, and/or proximity to another component. In other embodiments, first sensor 1100 can include a capacitive sensor or capacitive displacement sensor, a sensor based on the Doppler effect, an inductive sensor, an optical sensor, radar, sonar, or a fiber optics sensor. Other embodiments may include any type of sensors that can detect a connection between two components.

In some embodiments, as depicted in the magnified views of FIGS. 11 and 12, first sensor 1100 may be disposed in midfoot region 125 of first article 100. In one embodiment, first sensor 1100 can be located within or adjacent to housing 272 of charging assembly 270. However, in other embodiments, first sensor 1100 can be located anywhere in first article 100 or in the charging unit itself. In some embodiments, a portion of first sensor 1100 may be disposed in the charging unit and a portion of first sensor 1100 may be disposed in first article 100.

Referring to FIG. 11, as first article 100 is not yet connected to first component 112, first sensor 1100 is not engaged or activated. In this case, first article 100 is shown in laced state 1102 (see a first lacing region view 1150). However, as shown in subsequent FIG. 12, when first article 100 is connected with first component 112, first sensor 1100 can become activated in some embodiments. In some embodiments, the engagement of first sensor 1100 can initiate a series of events in the article of footwear and lead to a change in the state of automated tensioning system 150. In one embodiment, the activation or engagement of first sensor 1100 initiates a process whereby first article 100 can transition from laced state 1102 (see FIG. 11) to unlaced state 1204 (shown in second lacing region view 1250). Thus, in some embodiments, the engagement of first sensor 1100 may inform tensioning system 150 that first article 100 is now connected to a charging device, and an auto-unlacing process (depicted in FIG. 12 with arrows) of first article 100 should occur.

Figure 13:
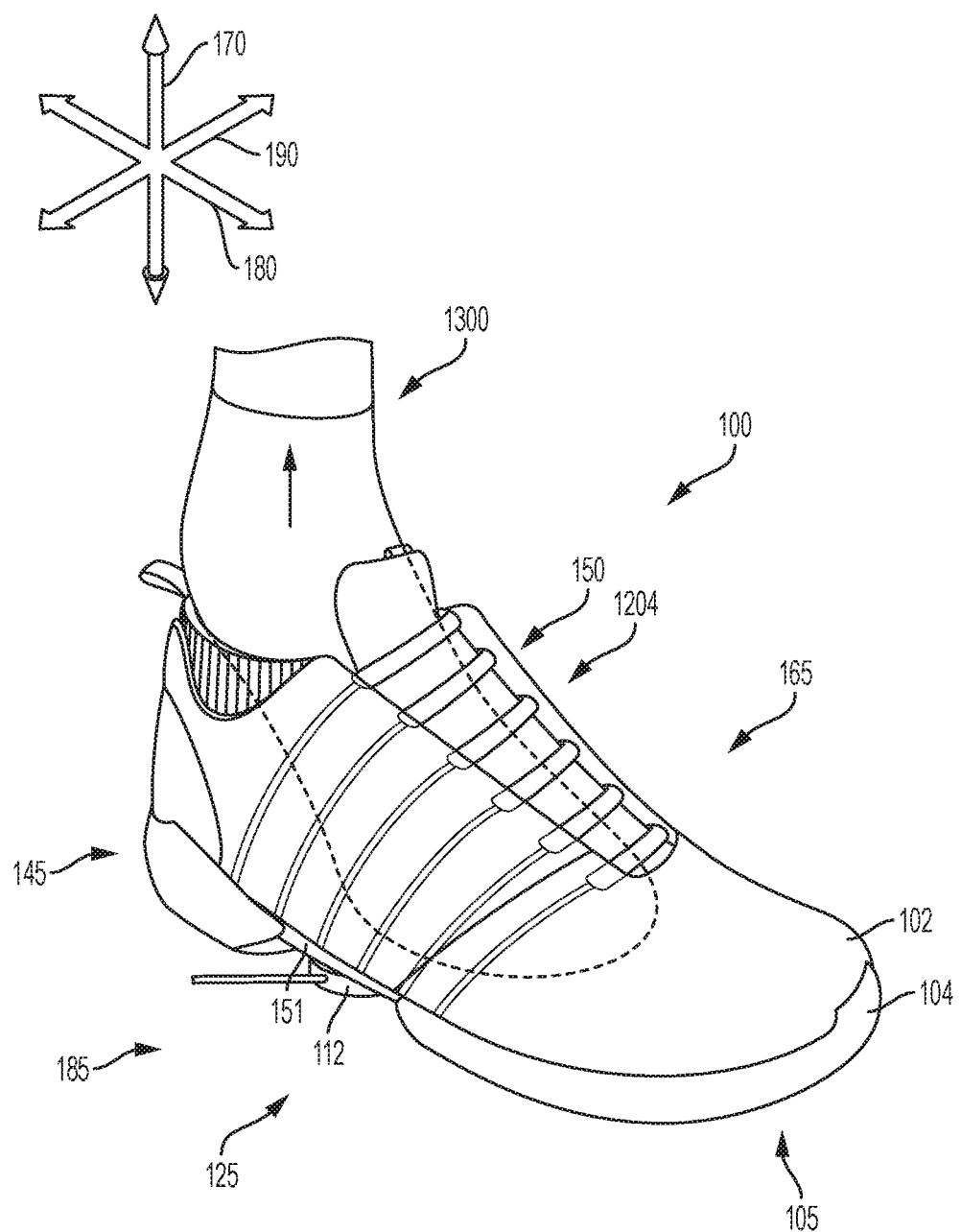
FIG. 13 is a rear isometric view of an embodiment of an article of footwear during charging and a foot being removed from the article of footwear.
Figure 14:
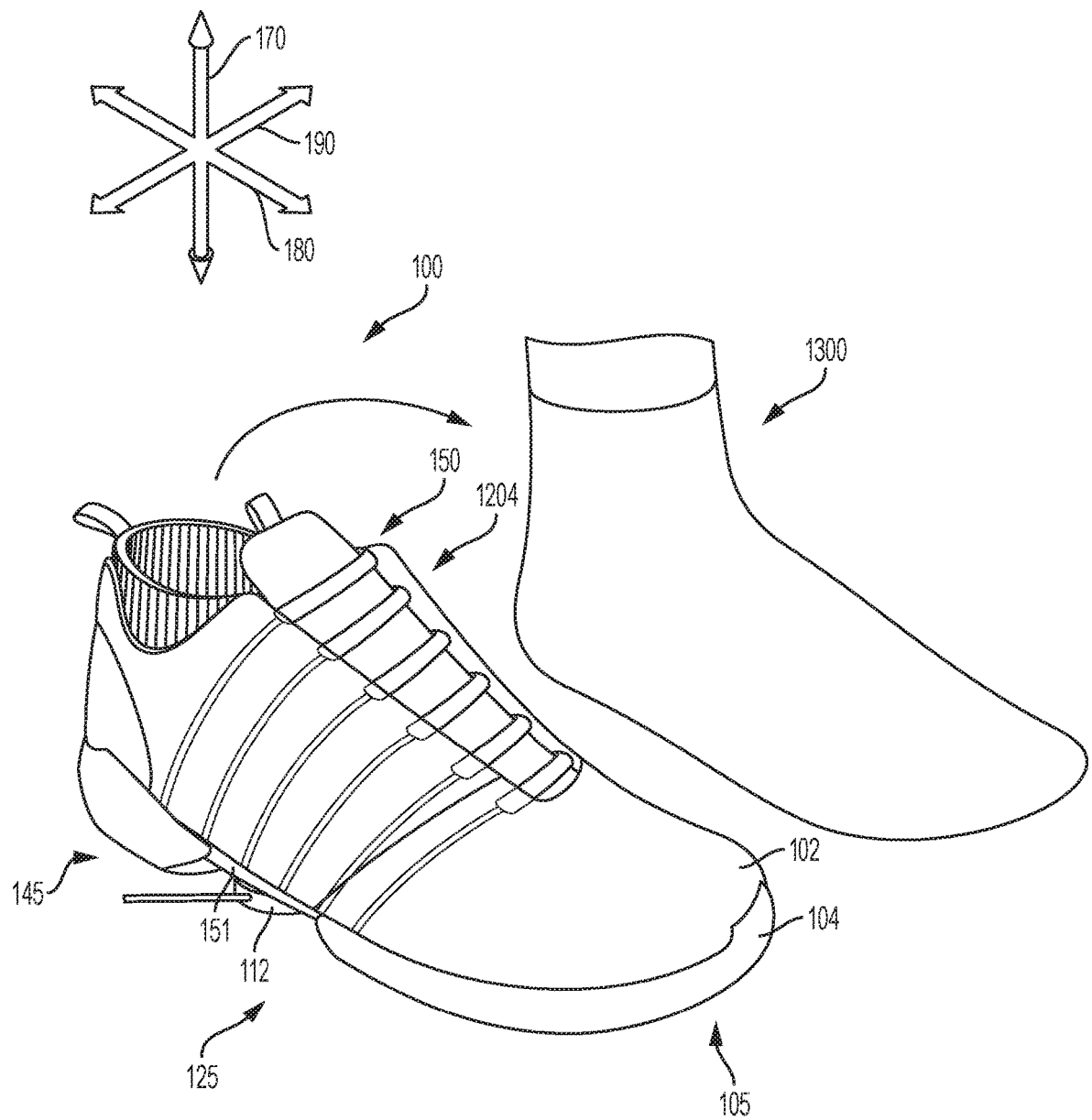
FIG. 14 is a rear isometric view of an embodiment of an article of footwear during charging and a foot removed from the article of footwear.

The decrease in tension of first article 100 can allow a foot to be more readily removed from first article 100 in different embodiments. In FIG. 13, a foot 1300 is shown as it is being removed from first article 100. First article 100 is connected to first component 112 and, as discussed above with respect to FIGS. 11 and 12, first article 100 is in unlaced state 1204. In some embodiments, unlaced state 1204 may facilitate the removal of foot 1300 from first article 100 by allowing foot 1300 to be removed without additional interaction or adjustment of first article 100 by a user. However, in other embodiments, a user may hold first article 100 while removing foot 1300 from first article 100. FIG. 14 shows the full removal of foot 1300 from first article 100, where first article 100 remains connected to first component 112. Thus, in some embodiments, during the foot removal process, first article 100 can be connected to the charging unit. In one embodiment, first article 100 can charge while foot 1300 is removed from first article 100.

Figure 15:
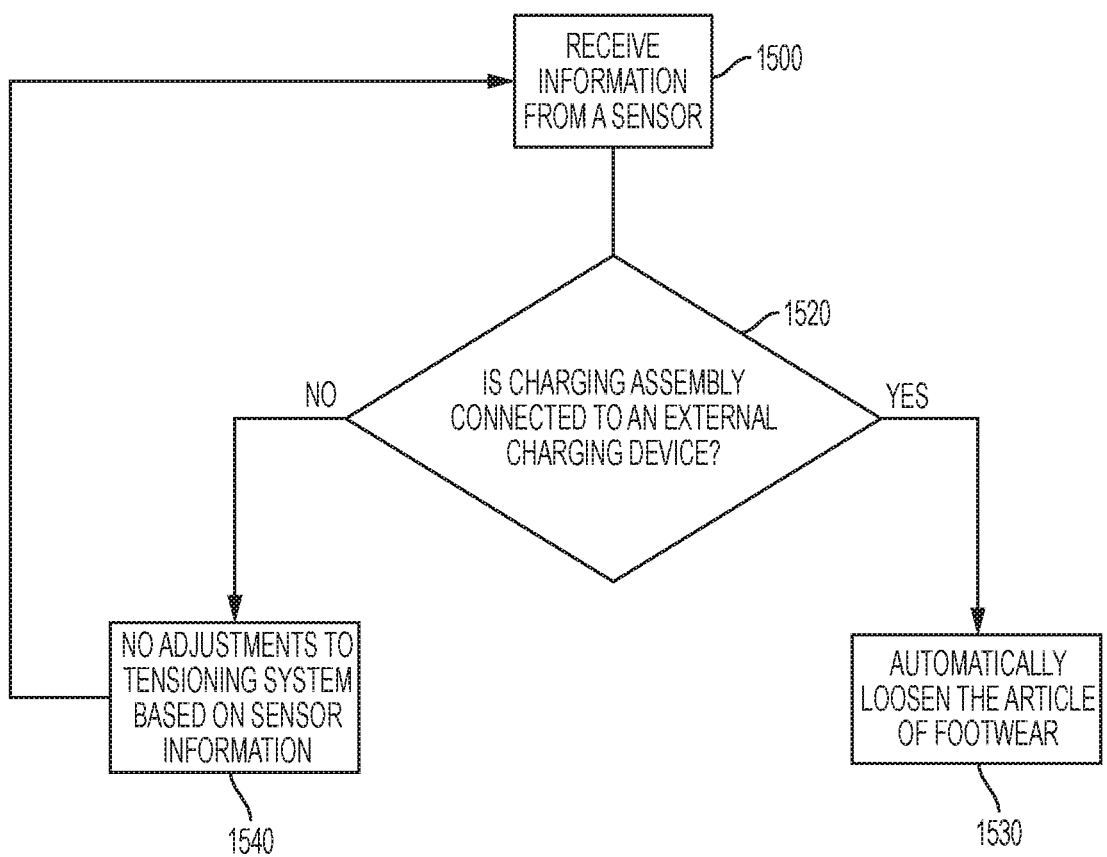
FIG. 15 is an embodiment of a flow diagram for a process of an automated fastening system.

It should be understood that the embodiments of the charging system depicted herein may be used in different ways. For purposes of illustration, FIG. 15 provides a flow chart depicting one process of controlling an article of footwear, where the article of footwear includes an upper, a sole structure, an interior cavity, an automated tensioning system, a battery, a charging assembly, and a sensor. The article of footwear can receive information from a sensor in a first step 1500. In one embodiment, the method of controlling the article of footwear can include a second step 1510 of determining whether the charging assembly is connected to the external charging device. Furthermore, a third step 1530 can comprise automatically loosening the article of footwear through an operation of the automated tensioning system if the sensor determines that the charging assembly is connected to the external charging device. In addition, a fourth step 1540 comprises making no adjustments to the tensioning system based on the sensor information if the sensor does not determine that the charging assembly is connected to the external charging device.

In other embodiments, one article or a pair of footwear can be charged and then removed to permit the charging of additional (different) pairs of footwear with the same charging unit. Furthermore, additional embodiments can further comprise the step of determining if the battery is charged. In another embodiment, an additional step can comprise determining if a foot is disposed in the interior cavity of the article of footwear. In some embodiments, another step can include automatically tightening the article of footwear through an operation of the automated tensioning system if the battery is charged and a foot is disposed in the interior cavity. Additional embodiments can comprise inductively charging the article of footwear when the charging assembly is connected to the external charging device.

Furthermore, in another embodiment, second step 1510 of detecting a connection also includes determining if magnetic coupling has occurred between the charging assembly and the external charging device. In addition, in some embodiments, third step 1530 of automatically loosening the article of footwear can further include the step of instructing the automated tensioning system to loosen the article of footwear.

Figure 16:
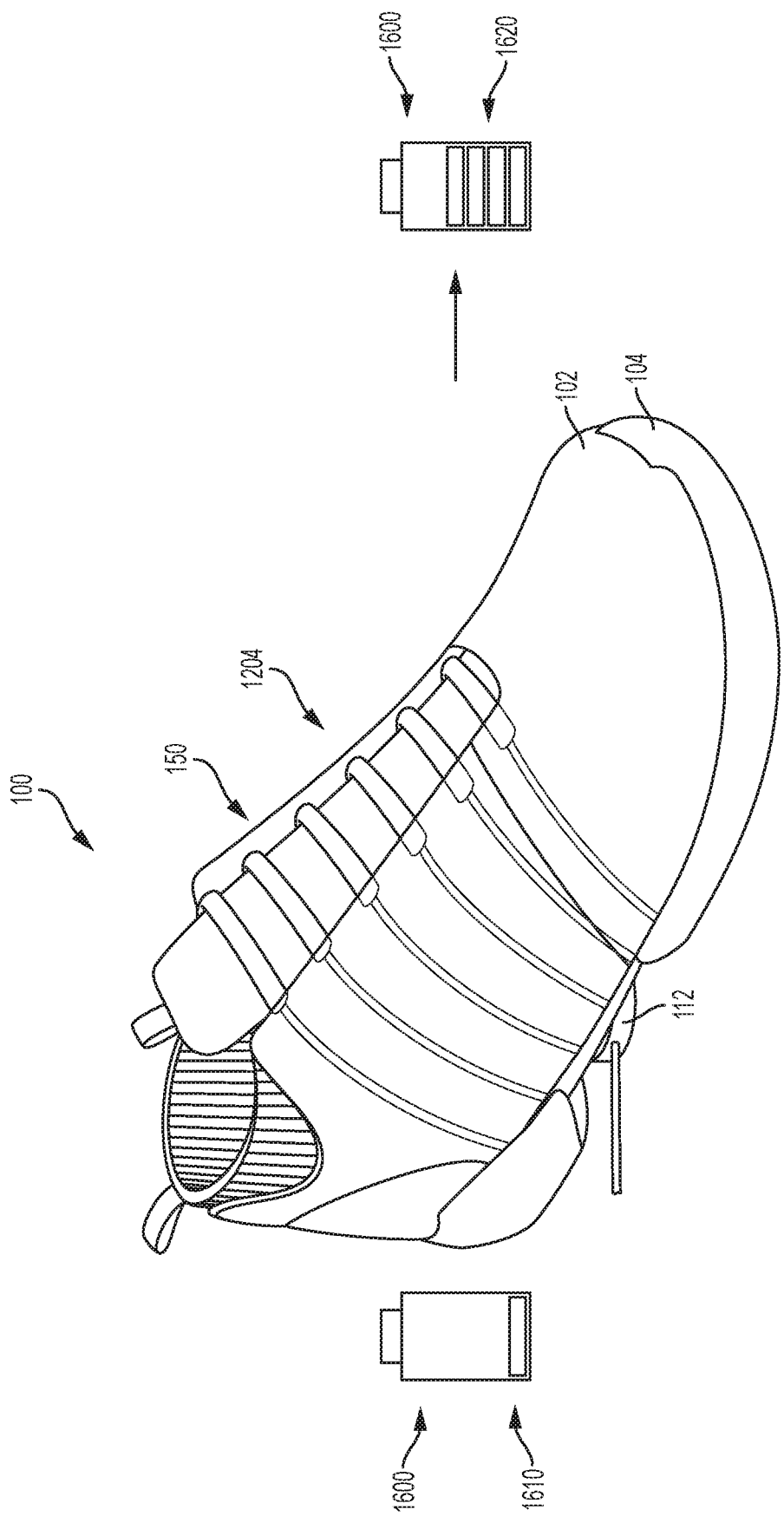
FIG. 16 is a rear isometric view of an embodiment of an article of footwear during charging.

As described above, in some embodiments, the external charging unit may include provisions for charging a battery or other power source associated with the article of footwear. FIG. 16 is one embodiment of the charging process with respect to first article 100. In different embodiments, once a user has connected first article 100 to a charging source (here first component 112), the battery associated with first article 100 may be charged. In some embodiments, as first article 100 is connected to first component 112, the energy level of a battery 1600 may increase over time. In the illustration of FIG. 16, battery 1600 of first article 100 is nearly depleted at the time of the connection, as shown with a first energy level 1610. However, in other embodiments, battery 1600 can be in any other energy state or have any other energy level.

Figure 17:
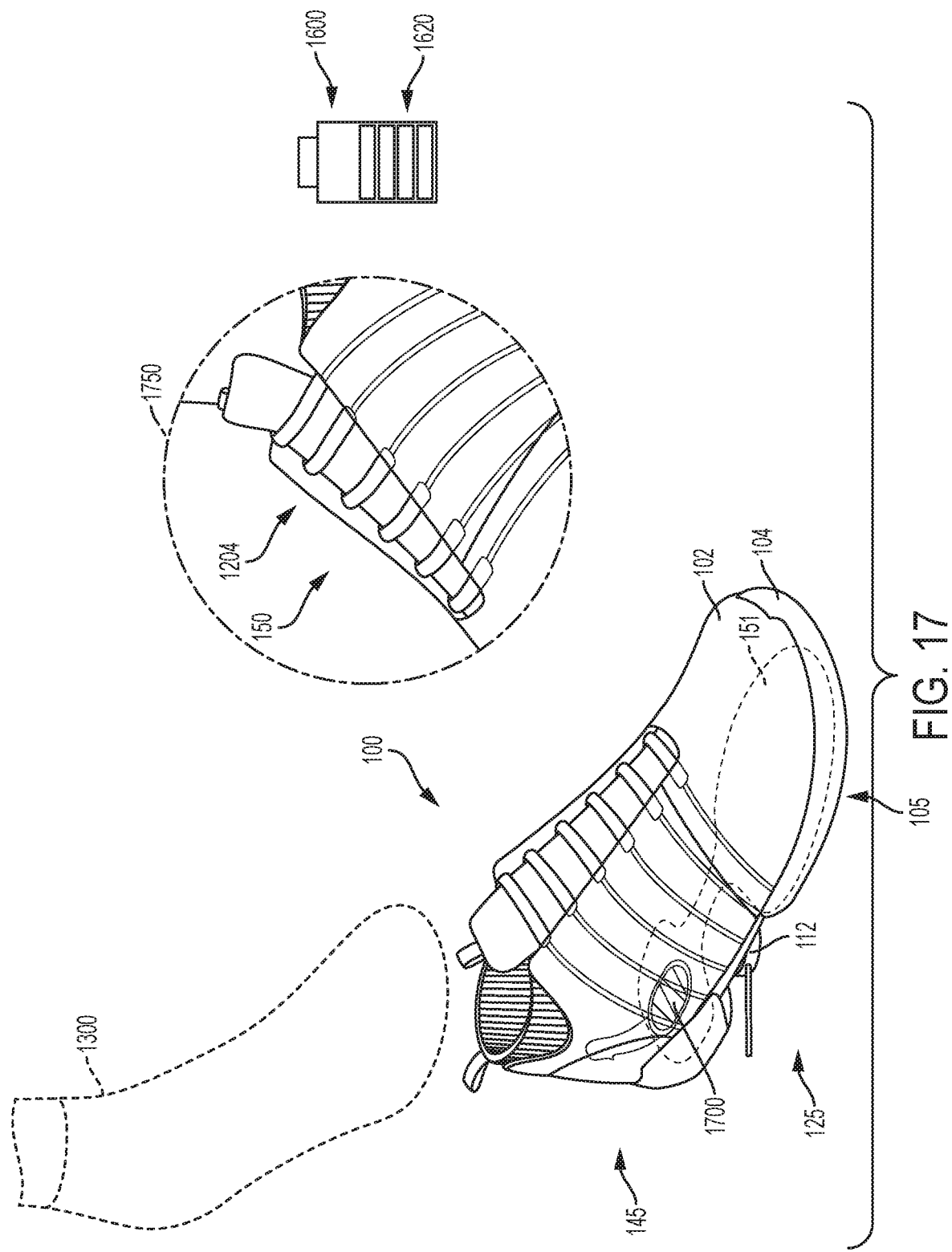
FIG. 17 is an isometric view of an embodiment of an article of footwear during charging and a foot being inserted into the article of footwear.
Figure 18:
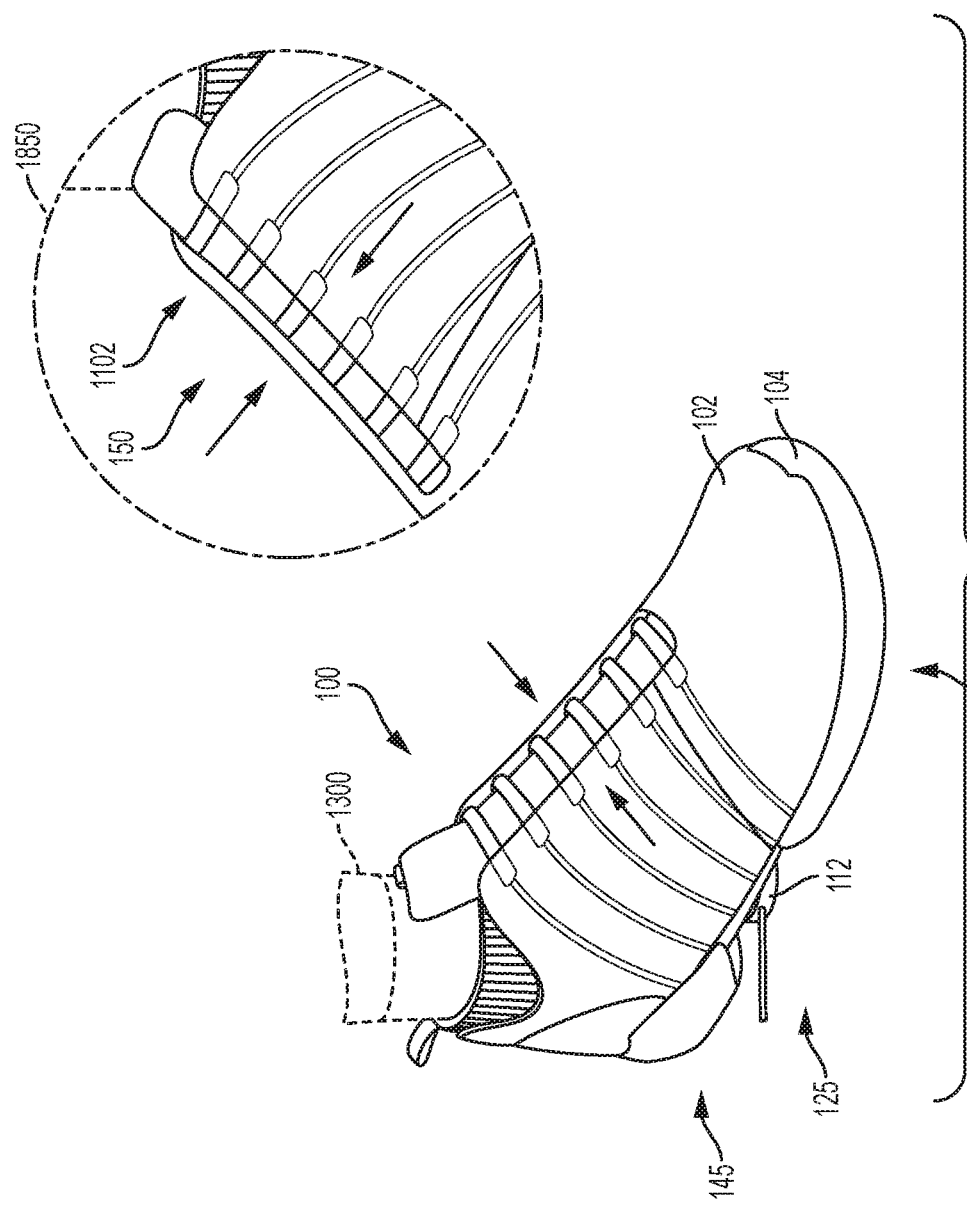
FIG. 18 is an isometric view of an embodiment of an article of footwear during charging and a foot inserted in the article of footwear.

In FIG. 16, it can be seen that first article 100 remains in unlaced state 1204 during the charging process. However, in other embodiments, the amount of tension of the article of footwear during charging can vary from that depicted here. Once battery 1600 is sufficiently charged (for example, the energy level of battery 1600 is above a certain operating threshold, or battery 1600 is fully charged), as shown with a second energy level 1620, the article may be configured for normal operations. Referring to FIGS. 17 and 18, a user may return to first article 100 following a duration of time sufficient to charge the battery for use in normal operation. This duration may vary widely, as, for example, the energy level of the battery can vary at the time the connection between first article 100 and first component 112 occurs, or the battery model or type may differ in different embodiments. In other embodiments, other features may be configured differently in different embodiments, such that the time required to charge the battery is variable.

In FIG. 17, a user is beginning to insert foot 1300 into first article 100 with battery 1600 at second energy level 1620. During this process, first article 100 remains connected to charging unit 110. However, it should be understood that in other embodiments, first article 100 may be first disconnected from the corresponding charging unit before foot 1300 is inserted.

As mentioned above, in some embodiments, different states or functions of the automated tensioning system may be triggered by the activation of a sensor. In some embodiments, an autolacing process may be initiated by the activation of a second sensor 1700 located in the article of footwear. In some embodiments, the sensor can detect changes in pressure. In different embodiments, second sensor 1700 may detect and measure a relative change in a force or applied load, detect and measure the rate of change in force, identify force thresholds, and/or detect contact and/or touch. In some cases, the sensor may comprise a generally two-dimensional material. In some embodiments, second sensor 1700 may include a piezoelectric material. In other embodiments, second sensor 1700 may have different dimensions and/or shapes in different embodiments and be disposed in other regions or portions of first article 100 than shown here. In some embodiments, the application of pressure (for example, of a foot being inserted into first article 100) can activate second sensor 1700, which in turn can trigger other events, such as autolacing.

In one embodiment, second sensor 1700 can comprise a force sensitive resistor (FSR). In some cases, as depicted in FIG. 17, the FSR (here, second sensor 1700) may be located along heel region 145 of first article 100. Referring to FIG. 17, as a user begins to insert his/her foot 1300 into first article 100, the FSR has not yet been engaged or activated. Prior to the insertion of foot 1300, first article 100 may be in unlaced state 1204, as shown in third lacing region view 1750. However, as shown in subsequent FIG. 18, when foot 1300 is fully inserted into first article 100, such that the heel of foot 1300 can apply pressure along heel region 145, second sensor 1700 (shown in FIG. 17) can become activated in some embodiments. In one embodiment, when second sensor 1700 detects a predetermined or preset amount of pressure or weight (i.e., a force), second sensor 1700 becomes activated. In some embodiments, the engagement of second sensor 1700 can initiate a series of events and/or cause a change in the state of the automated tensioning system. In one embodiment, the activation or engagement of second sensor 1700 initiates a process whereby first article 100 can transition from unlaced state 1204 of FIG. 17 to laced state 1102 (shown in fourth lacing region view 1850 in FIG. 18). Thus, in some embodiments, the engagement of second sensor 1700 may inform the system that article 100 is now being used or worn by a user, and that an autolacing process (represented by arrows in FIG. 18) may occur. In one embodiment, the autolacing process moves the article to laced state 1102.

Figure 19:
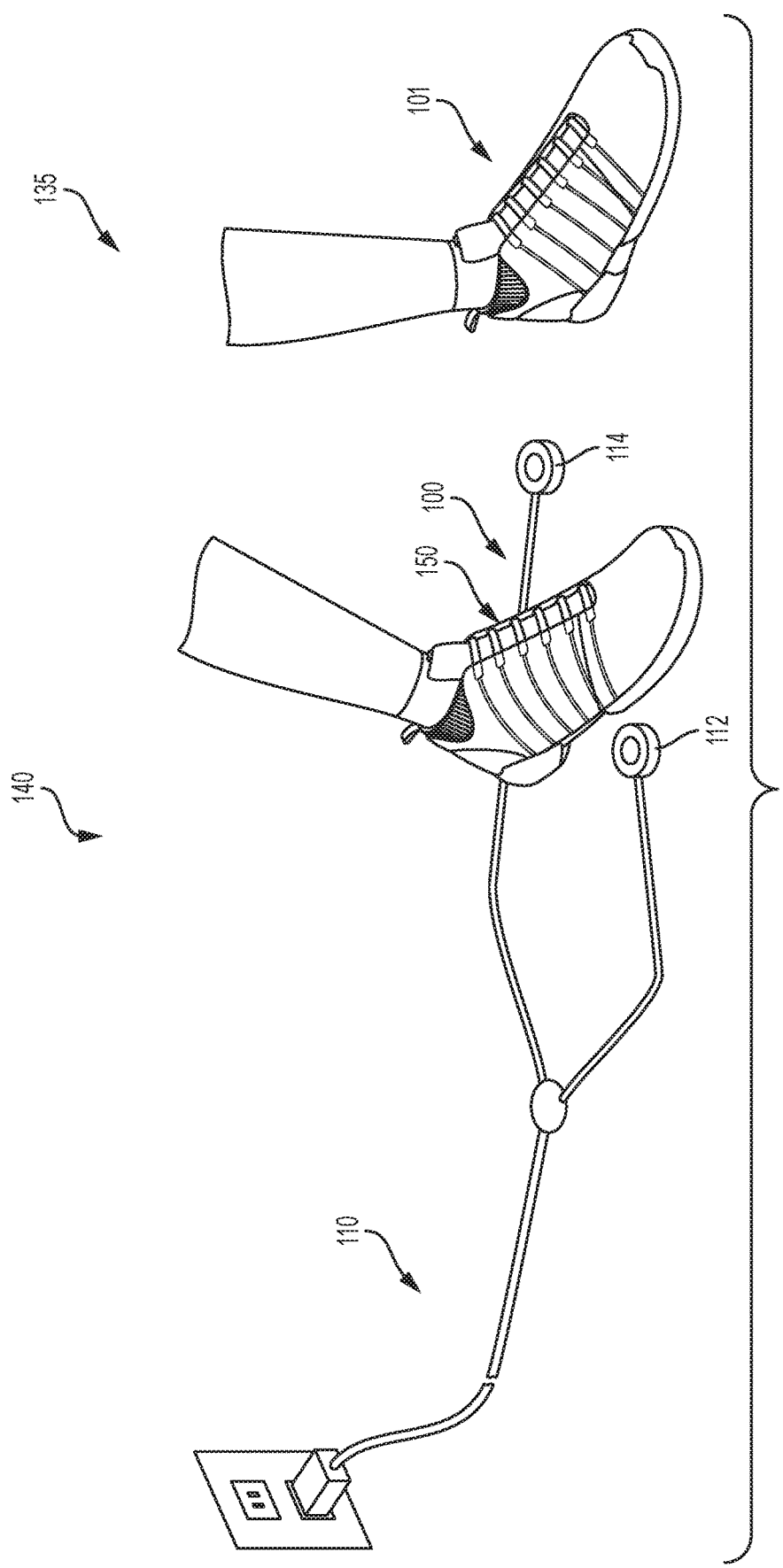
FIG. 19 is a schematic view of an embodiment of a pair of footwear with a charging system.

Thus, as shown in FIG. 19, in different embodiments, automated tensioning system 150 may include provisions to automatically tighten one or more article of footwear. In some embodiments, the automatic tightening is configured to occur once the article detects that a user has resumed the wearing of pair 135, and pair 135 is sufficiently charged for normal operations. The autolacing feature may facilitate the use of an article of footwear by allowing a user to rapidly and easily insert a foot into the article of footwear and be automatically fitted (i.e., whereby the tension level of the article is increased to a desired or preset setting) and ready for regular use. In some embodiments, the autolacing process may occur only when the article remains connected to the charger unit and a foot is inserted into the article. In other embodiments, the autolacing can occur when a foot is inserted into the article, regardless of whether the article is still connected to the charger unit. However, in still other embodiments, the insertion of a foot into the article of footwear does not necessarily trigger the autolacing process, and such an operation may be optional.

In some embodiments, in order to detach the external charging component from an article of footwear, a user may simply pull first article 100 away from charging component 112 until the pulling force exceeds the attractive magnetic force between first element 810 and second element 820 (see FIGS. 8-10). In other embodiments, the system may include an additional device that can be adjusted or manipulated to "unlock" first article 100 from charging component 112. For example, there may be a pull tab such as a tensile element, a loop, or a hook that extends from a portion of first article 100 and can be grasped by a user and help release first article 100 from charging component 112.

It will be understood that the charging system discussed in this detailed description and in the claims can be used independently of a tensioning system. In particular, since the charging system discussed in this detailed description is used to charge a battery of some kind, that battery can be further coupled to one or more different electrical systems. Generally, the charging system discussed in this detailed description and in the claims may be used to power any type of electrical system associated with an article of footwear. For example, in another embodiment, the charging system discussed in this embodiment could be used to charge a battery to power an accelerometer or a sensor for tracking distance and motion. In still another embodiment, the charging system discussed here could be used to power a heating and/or cooling system for an article. Furthermore, it will be understood that the charging system could be used to power two or more electrical systems simultaneously. In addition, the embodiments of the external charging unit as described herein may be utilized with any type or configuration of footwear or article of apparel that have any type of system or mechanism.

In addition, in some embodiments, the charging unit need not be adjusted to accommodate different sizes of footwear. In other words, some or all portions of the charging system, such as the charging unit, can retain their original shape and dimensions and be used with footwear ranging in size from a "child size" to an "adult size." For example, in some embodiments the charging system can be utilized with footwear ranging between U.S. standard size 6 and larger. In another embodiment, the charging system could be used with footwear ranging from U.S. standard size 4 and 20. In one embodiment, the charging system could be used with footwear ranging from U.S. standard child size 5 to a men's size 21 or larger.

Furthermore, the embodiments described herein may also include or refer to techniques, concepts, features, elements, methods, and/or components from U.S. Patent Publication Number US-2016-0345679-A1, published Dec. 1, 2016, (previously U.S. patent application Ser. No. 14/723,972, filed May 28, 2015), titled "An Article of Footwear and a Method of Assembly of the Article of Footwear,", U.S. Patent Publication Number US-2016-0345653-A1, published Dec. 1, 2016, (previously U.S. patent application Ser. No. 14/723,832, filed May 28, 2015), titled "A Lockout Feature for a Control Device," U.S. Patent Application No. 62/167,881, filed May 28, 2015), titled "Method of Operation for Article of Footwear with Autolace," U.S. Patent Publication Number US-2016-0345654-A1, published Dec. 1, 2016, (previously U.S. patent application Ser. No. 14/723,880, filed May 28, 2015), titled "An Article of Footwear And A Charging System For An Article Of Footwear," U.S. Patent Publication Number US-2016-0345671-A1, published Dec. 1, 2016, (previously U.S. patent application Ser. No. 14/723,994, filed May 28, 2015), titled "A Sole Plate for an Article of Footwear," U.S. Patent Publication Number US-2016-0345655-A1, published Dec. 1, 2016, (previously U.S. patent application Ser. No. 14/724,007, filed May 28, 2015), titled "A Control Device for an Article of Footwear," and U.S. Patent Publication Number US-2016-0345681-A1 published Dec. 1, 2016, (previously U.S. patent application Ser. No. 14/955,705, filed Dec. 1, 2015), titled "An Automated Tensioning System for an Article of Footwear," and the entirety of each application being herein incorporated by reference.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. A kit of parts, the kit of parts comprising:
an article of footwear with an upper, a sole structure, an interior cavity, an automated tensioning system, a battery, a charging assembly, and a first sensor;
an external charging device configured to connect with the charging assembly in order to charge the battery of the article of footwear; and
the charging assembly of the article of footwear including a ferromagnetic material, wherein the charging assembly is configured to be magnetically secured to the external charging device;
wherein the external charging device includes a first component, a second component, and a Y-type cable, the Y-type cable having a first end, a second end, and a third end, wherein the first end of the Y-type cable connects to the first component, the second end of the Y-type cable connects to the second component, and the third end of the Y-type cable is configured to connect to an external power source;
wherein magnetically securing the charging assembly to the first component is configured to allow a user to remove a foot from the interior cavity of the article of footwear while the charging assembly is connected to the first component.

2. The kit of parts of claim 1, wherein the automated tensioning system is configured to adjust a tension level of the article of footwear from a first tension level to a second tension level when the first sensor detects a connection between the charging assembly and the external charging device, and wherein the first tension level is greater than the second tension level.

3. The kit of parts of claim 2, wherein the article of footwear further includes a second sensor, wherein the automated tensioning system is configured to adjust the tension level of the article of footwear from the second tension level to a third tension level when the second sensor detects an insertion of a foot into the interior cavity of the article of footwear and the battery is charged, and wherein the third tension level is greater than the second tension level.

4. The kit of parts of claim 1, wherein the charging assembly is configured to connect with the first component or the second component.

5. The kit of parts of claim 1, wherein the charging assembly includes a receiving recess configured to receive the first component, and wherein a height of the receiving recess is greater than a height of the first component.

6. A method, comprising:
obtaining an article of footwear with an upper, a sole structure, an interior cavity, an automated tensioning system, a battery, a charging assembly, and a first sensor;
magnetically securing an external charging device with the charging assembly of the article of footwear in order to charge the battery of the article of footwear, wherein the charging assembly includes a ferromagnetic material to facilitate the magnetically securing with the external charging device;
wherein the external charging device includes a first component, a second component, and a Y-type cable, the Y-type cable having a first end, a second end, and a third end, further comprising connecting the first end of the Y-type cable connects to the first component, connecting the second end of the Y-type cable to the second component, and connecting the third end of the Y-type cable to an external power source.

7. The method of claim 6, further comprising adjusting a tension level of the article of footwear from a first tension level to a second tension level when the first sensor detects a connection between the charging assembly and the external charging device, and wherein the first tension level is greater than the second tension level.

8. The method of claim 7, wherein the article of footwear further includes a second sensor, and further comprising adjusting the tension level of the article of footwear from the second tension level to a third tension level when the second sensor detects an insertion of a foot into the interior cavity of the article of footwear and the battery is charged, and wherein the third tension level is greater than the second tension level.

9. The method of claim 6, further comprising connecting the charging assembly with the first component or the second component.

10. The method of claim 6, further comprising receiving the first component in a receiving recess of the charging assembly, wherein a height of the receiving recess is greater than a height of the first component.

11. The method of claim 6, wherein the magnetic coupling between the charging assembly of the article of footwear and the first component is configured to allow a user to remove a foot from the interior cavity of the article of footwear while the charging assembly is connected to the first component.

* * * * *

UNITED STATES PATENT AND TRADEMARK OFFICE
CERTIFICATE OF CORRECTION

PATENT NO. : 11,172,726 B2  
APPLICATION NO. : 16/653034  
DATED : November 16, 2021  
INVENTOR(S) : Tiffany A. Beers It is certified that error appears in the above-identified patent and that said Letters Patent is hereby corrected as shown below:

On the Title Page

On page 4, in Column 1, under "Foreign Patent Documents", Line 54, delete "WO-201 6191115" and insert --WO-2016191115-- therefor On page 5, in Column 1, under "Other Publications", Line 7, delete "Frinal" and insert --Final-- therefor On page 6, in Column 2, under "Other Publications", Line 39, delete "anti" and insert --and-- therefor Signed and Sealed this  
Thirteenth Day of September, 2022

Katherine Kelly Vidal  
*Director of the United States Patent and Trademark Office*